United States Patent
Duppils et al.

(10) Patent No.: US 12,265,612 B2
(45) Date of Patent: Apr. 1, 2025

(54) METHOD FOR IDENTIFYING VULNERABILITIES IN COMPUTER PROGRAM CODE AND A SYSTEM THEREOF

(71) Applicant: debricked AB, Malmö (SE)

(72) Inventors: Anton Duppils, Södra Sandby (SE); Magnus Tullberg, Lund (SE); Carl Emil Orm Wåreus, Lund (SE)

(73) Assignee: DEBRICKED AB (SE)

( * ) Notice: Subject to any disclaimer, the term of this patent is extended or adjusted under 35 U.S.C. 154(b) by 146 days.

(21) Appl. No.: 17/759,019

(22) PCT Filed: Jan. 22, 2021

(86) PCT No.: PCT/EP2021/051488
§ 371 (c)(1),
(2) Date: Jul. 18, 2022

(87) PCT Pub. No.: WO2021/148625
PCT Pub. Date: Jul. 29, 2021

(65) Prior Publication Data
US 2023/0036159 A1    Feb. 2, 2023

(30) Foreign Application Priority Data
Jan. 23, 2020    (SE) .................................. 2050062-5

(51) Int. Cl.
*G06F 21/00* (2013.01)
*G06F 18/21* (2023.01)
(Continued)

(52) U.S. Cl.
CPC .......... *G06F 21/554* (2013.01); *G06F 18/214* (2023.01); *G06F 18/2178* (2023.01); *G06F 21/552* (2013.01)

(58) Field of Classification Search
CPC .. G06F 21/554; G06F 18/214; G06F 18/2178; G06F 21/552; G06N 3/044; G06N 3/047; G06N 3/082; G06N 3/088
See application file for complete search history.

(56) References Cited

U.S. PATENT DOCUMENTS

2018/0053701 A1    2/2018    Chen et al.
2018/0285740 A1    10/2018   Smyth et al.
(Continued)

FOREIGN PATENT DOCUMENTS

CN    107832476 A    3/2018

OTHER PUBLICATIONS

International Search Report and Written Opinion mailed May 6, 2021, issued in corresponding International Patent Application No. PCT/EP2021/051488, filed Jan. 22, 2021, 13 pages.
(Continued)

*Primary Examiner* — Ghazal B Shehni
(74) *Attorney, Agent, or Firm* — Sheridan Ross P.C.

(57) ABSTRACT

Open-source software is prevalent in the development of new technologies. Monitoring software updates for vulnerabilities is expensive and time consuming. Online discussions surrounding new software updates can often provide vital information regarding emerging risks. It is presented a novel approach for automating surveillance of software through the use of natural language processing methods on open-source issues. Further, the potential of virtual adversarial training, a popular semi-supervised learning technique, is used to leverage the vast amounts of unlabeled data available to achieve improved performance. On industry data, it is found that a hierarchical attention network with virtual adversarial training that utilizes the innate document structure to encapsulate the text can be used with good results.

20 Claims, 18 Drawing Sheets

(51) Int. Cl.
 *G06F 18/214* (2023.01)
 *G06F 21/55* (2013.01)

(56) References Cited

U.S. PATENT DOCUMENTS

2018/0288086 A1   10/2018   Amiri et al.
2021/0067549 A1*  3/2021   Chen .................. G06N 3/084
2021/0304002 A1*  9/2021   George ................ G06N 3/047

OTHER PUBLICATIONS

Duppils, A., and M. Tullberg, "Semi-Supervised Text Classification: Automated Weak Vulnerability Detection," Master's Thesis, <https://lup.lub.lu.se/luur/download?func=downloadFile&recordOId=9023542&fileOId=9023544> [retrieved Apr. 9, 2021], Jan. 2020, 74 pages.

Palacio, D. et al., "Learning to Identify Security-Related Issues Using Convolutional Neural Networks", 2019 IEEE International Conference on Software Maintenance and Evolution (ICSME), IEEE, Sep. 29, 2019, pp. 140-144.

Poon H.-K., et al., "Hierarchical Gated Recurrent Neural Network with Adversarial and Virtual Adversarial Training on Text Classification", Neural Networks, vol. 119, pp. 299-312, Sep. 2019.

Zhang, W., et al., "Attentive Representation Learning with Adversarial Training for Short Text Clustering", arXiv Labs, <https://arxiv.org/abs/1912.03720v1>, Cornell University, Dec. 2019 (v.1), 8 pages.

Search Report mailed Oct. 15, 2020, issued in Swedish Application No. 2050062-5, filed Jan. 23, 2020, 2 pages.

Office Action mailed Oct. 15, 2020, issued in Swedish Application No. 2050062-5, filed Jan. 23, 2020, 6 pages.

\* cited by examiner

| dog | 1 | 0 | 0 | 0 |
| cat | 0 | 1 | 0 | 0 |
| panda | 0 | 0 | 1 | 0 |
| fox | 0 | 0 | 0 | 1 |

|  | TF |  |  |  | TF-IDF |  |  |
|---|---|---|---|---|---|---|---|
| Term | D1 | D2 | D3 | IDF | D1 | D2 | D3 |
| The | 1 | 1 | 2 | 0 | 0 | 0 | 0 |
| Car | 1 | 0 | 0 | 0.477 | 0.477 | 0 | 0 |
| Is | 1 | 0 | 2 | 0.176 | 0.176 | 0 | 0.352 |
| Red | 1 | 0 | 1 | 0.176 | 0.176 | 0 | 0.176 |
| Bird | 0 | 1 | 0 | 0.477 | 0 | 0.477 | 0 |
| Eats | 0 | 1 | 0 | 0.477 | 0 | 0.477 | 0 |
| Worms | 0 | 1 | 0 | 0.477 | 0 | 0.477 | 0 |
| House | 0 | 0 | 2 | 0.477 | 0 | 0 | 0.954 |
| Big | 0 | 0 | 1 | 0.477 | 0 | 0 | 0.477 |
|  |  |  |  |  |  |  |  |
| Document 1(D1): The car is red. Document 2(D2): The bird eats worms. Document 3(D3): The house is big. The house is red. | | | | | | | |

| Dataset | Github | NVD | Gitlab |
|---|---|---|---|
| Train Dataset | | | |
| non-security related | 47095 | 0 | 460 |
| security | 3691 | 47662 | 452 |
| Validation Dataset | | | |
| non-security related | 4683 | 0 | 66 |
| security | 453 | 5242 | 55 |
| User Labeled Test Dataset | | | |
| non-security related | 555 | 0 | 0 |
| security | 514 | 0 | 0 |
| Debricked Labeled Test Dataset | | | |
| non-security related | 835 | 0 | 0 |
| security | 112 | 0 | 0 |

*Fig. 14*

| Top Word Unigrams Descending Order | |
|---|---|
| NVD (filtered) | Github |
| allows | js |
| vulnerability | error |
| attackers | node |
| improper | version |
| arbitrary | file |
| cve | com |
| web | lib |
| site | using |
| execute | use |

*Fig. 15*

| Top Word Bigrams Descending Order | |
|---|---|
| NVD (filtered) | Github |
| remote attackers | node modules |
| allows remote | github com |
| cross site | youtube dl |
| execute arbitrary | usr lib |
| cve cve | py line |
| denial service | usr local |
| site scripting | https github |
| cause denial | steps reproduce |
| attackers execute | framework versions |

| User Labeled Test Set | Precision | Recall | F1 score | N |
|---|---|---|---|---|
| LogisticRegression | | | | |
| non-security related | 65% | 99% | 79% | 555 |
| security | 99% | 42% | 59% | 514 |
| macro average | 81% | 72% | 69% | 1069 |
| SRN | | | | |
| non-security related | 66% | 99% | 79% | 555 |
| security | 97% | 44% | 61% | 514 |
| macro average | 81% | 71% | 70% | 1069 |
| HAN | | | | |
| non-security related | 68% | 99% | 80% | 555 |
| security | 97% | 49% | 65% | 514 |
| macro average | 82% | 74% | 73% | 1069 |
| HAVAN (HAN w/ VAT) | | | | |
| non-security related | 66% | 99% | 79% | 555 |
| security | 97% | 44% | 61% | 514 |
| macro average | 82% | 72% | 70% | 1069 |

| Debricked Test Set | Precision | Recall | F1 score | N |
|---|---|---|---|---|
| LogisticRegression | | | | |
| non-security related | 92% | 92% | 92% | 835 |
| security | 40% | 39% | 40% | 112 |
| macro average | 66% | 66% | 66% | 947 |
| SRN | | | | |
| non-security related | 91% | 89% | 90% | 835 |
| security | 30% | 36% | 33% | 112 |
| macro average | 61% | 62% | 61% | 947 |
| HAN | | | | |
| non-security related | 91% | 97% | 94% | 835 |
| security | 57% | 33% | 42% | 112 |
| macro average | 74% | 65% | 68% | 947 |
| HAVAN (HAN w/ VAT) | | | | |
| non-security related | 92% | 98% | 95% | 835 |
| security | 75% | 35% | 48% | 112 |
| macro average | 83% | 67% | 71% | 947 |

Fig. 25

| | AUC |
|---|---|
| LogisticRegression | |
| User Labeled Test Set | 0.962 |
| Debricked Test Set | 0.729 |
| SRN | |
| User Labeled Test Set | 0.955 |
| Debricked Test Set | 0.634 |
| HAN | |
| User Labeled Test Set | 0.932 |
| Debricked Test Set | 0.666 |
| HAVAN (HAN w/ VAT) | |
| User Labeled Test Set | 0.939 |
| Debricked Test Set | 0.707 |

Fig. 26

| Top Word Unigrams | |
| --- | --- |
| NVD (filtered) | Github |
| allows | js |
| vulnerability | error |
| attackers | node |
| improper | version |
| arbitrary | file |
| cve | com |
| web | lib |
| site | using |
| execute | use |
| cross | src |
| service | function |
| memory | modules |
| buffer | https |
| scripting | line |
| cause | code |
| denial | app |
| information | new |
| sql | usr |
| input | issue |
| crafted | build |
| access | type |
| parameter | test |
| unspecified | http |
| allow | like |
| earlier | debug |
| neutralization | users |
| bounds | request |
| injection | github |
| attacker | object |

*Fig. 29*

| Top Word Bigrams | |
| --- | --- |
| NVD (filtered) | Github |
| remote attackers | node modules |
| allows remote | github com |
| cross site | youtube dl |
| execute arbitrary | usr lib |
| cve cve | py line |
| denial service | usr local |
| site scripting | https github |
| cause denial | steps reproduce |
| attackers execute | framework versions |
| improper neutralization | console log |
| arbitrary code | npm err |
| improper restriction | fff fff |
| bounds memory | com apple |
| memory buffer | dylib fff |
| attackers cause | file usr |
| operations bounds | expected behavior |
| restriction operations | lib python |
| web page | react native |
| input web | feature request |
| sql injection | library frameworks |
| page generation | linux gnu |
| neutralization input | module js |
| generation cross | index js |
| scripting xss | bug report |
| allow remote | src github |
| inject arbitrary | java org |
| arbitrary web | make sure |
| web script | usr bin |
| script html | latest version |

*Fig. 30*

METHOD FOR IDENTIFYING VULNERABILITIES IN COMPUTER PROGRAM CODE AND A SYSTEM THEREOF

TECHNICAL FIELD

The invention relates to software development and IT security in general. More particularly, it is related to a method for identifying vulnerabilities in computer program code and a system thereof.

BACKGROUND

The use of open-source software has proliferated in modern times, according to an Open Source Security and Risk Analysis report by Synopsys, 96% of codebases scanned in 2018 used open-source code [1]. A follow up report in 2019 shows an increase in open-source usage to more than 99%. Vulnerabilities in open-source components are often mismanaged as the same report also highlights that 40% of the aforementioned codebases feature open-source vulnerabilities that are more than 10 years old [2].

Open-source updates can expose security vulnerabilities. Keeping track of vulnerabilities in open-source software can help mitigate the potential damage done by malicious parties. It is hard to keep track of when a new vulnerability has been discovered. Human resources dedicated to vulnerability tracking is expensive and has limited reach. It has been found that 90% of exploited exposures are from previously known issues [3], therefore it is decidedly useful to be able to detect reported vulnerabilities in text.

SUMMARY

It is an object of the invention to at least partly overcome one or more of the above-identified limitations of the prior art. In particular, it is an object to provide methods and systems for identifying vulnerabilities associated with open source code such that software projects can be conducted in a more reliable manner and also in a more efficient manner. As an example, it may be used to identify and mitigate vulnerabilities introduced from open source dependencies or other imported open source components. Put differently, it may be the dependencies or open source components used that introduces the vulnerabilities.

An example of a truncated computer security related sentence can be viewed in FIG. 1. Automated weak vulnerability detection using text classification on discussions in open-source repositories could potentially provide awareness of security flaws. This disclosure explores the potential for automation, i.e. more efficient handling, with the goal of providing non-trivial classification of computer security discussion.

The work in this disclosure explores the possibilities of text classification in the domain of computer security. The results prove that the problem is indeed solvable with natural language processing (NLP) and achieve quite respectable performance on binary text classification. The HAN model architecture, first proposed by Yang et al. [4], attempts to make use of the innate structure of text and is the primary model proposed for this task. The use of machine learning in the computer security domain is intended to alleviate the great cost of human resources in monitoring open-source projects for potential vulnerabilities. The approach presented herein improves the coverage for vulnerability management. A quicker response is also possible, limiting damage. The best achieved performance for prediction on vulnerabilities is 97% precision with 49% recall on the main test set, achieving an F1 score of 65%. The best overall performance across several datasets is our HAVAN model, combining HAN with VAT.

According to a first aspect it is provided a method for identifying vulnerabilities in computer program code, said method comprising
  forming a training data set using semi-supervised learning (SSL) comprising the sub-steps of
    receiving labeled text data from a first database set, wherein the labeled text data comprises input (x) and label (y),
    receiving unlabeled text data from a second database set, wherein the unlabeled data comprises the input (x), wherein the unlabeled text data comprises sets of posts generated by a plurality of users,
    combining the unlabeled text data and the labeled text data (216) into the training set,
  training a model based on the training data set comprising the sub-step of
    minimizing a loss function (L) of the training set, wherein the loss function comprises parameters ($\theta$) used in the model,
  applying the model on the computer program code such that the vulnerabilities are identified.

The step of training may involve using virtual adversarial training (VAT), and the sub-step of
  forming a perturbated training set by applying perturbations to the training data set, and
  wherein the sub-step of minimizing the loss function (L) is based on the perturbated training set.

An advantage of using VAT is that the unlabeled data can be used in a way such that the model is improved, and the vulnerabilities are identified reliably.

The sets of posts may be marked as open or closed.

An advantage of this is that resolved matters may be distinguished from unresolved matters. By having this possibility conditions for forming a more reliable model is provided.

The posts may comprise time stamps.

Having time stamps provides for that newly found matters may be distinguished from matters known for some time, which provides for that the model can be improved. The time stamps can be combined with other information, for example a number of times the posts have been read and/or responded to.

The second database set may comprise a repository of standards-based vulnerability management data.

The second database set may comprise repositories publicly providing the sets of posts.

An advantage with having the information publicly available is that, for instance, the number of times a particular post has been read must be considered in view of how many persons that had access to it. By having them publicly available, the same conditions apply for all posts.

The computer program code may be open-source code.

The training set may comprise input (x) and the perturbated training set may comprise the input (x) plus a random perturbation (r), and the loss function may be a Kullback-Leibler divergence ($D_{KL}$) between a probability distribution of the training set and the probability distribution of the perturbated training set.

The model may be a Hierarchical Attention Network (HAN).

The model may comprise Recurrent Neural Network (RNN) layers.

The model may further comprise identifying amendments overcoming the vulnerabilities identified in the computer program code.

According to a second aspect it is provided a server configured for identifying vulnerabilities in computer program code, said system comprising a transceiver, a control unit and a memory, wherein the transceiver is configured to:
receive labeled text data from a first database set, wherein the labeled text data comprises input (x) and label (y),
receive unlabeled text data from a second database set, wherein the unlabeled data comprises the input (x), wherein the unlabeled text data comprises sets of posts generated by a plurality of users,
wherein the control unit is configured to execute:
a training set formation function configured to form a training data set using semi-supervised learning (SSL) by
a combination sub-function configured to combine the unlabeled text data and the labeled text data into a training set,
a training function configured to train a model based on the training data set by
a minimization function configured to minimize a loss function (L) of the training set, wherein the loss function comprises parameters ($\theta$) used in the model,
an application function configured to apply the model on the computer program code such that the vulnerabilities are identified.

The training function may be configured to train the model using virtual adversarial training (VAT) by a perturbating training set sub-function configured to form a perturbated training set by applying perturbations to the training data set, and the minimization function may be configured to minimize a loss function (L) of the perturbated training set.

The sets of posts may be marked as open or closed.

The posts may comprise time stamps.

Still other objectives, features, aspects and advantages of the invention will appear from the following detailed description as well as from the drawings. The same features and advantages described with respect to one aspect are applicable to the other aspect unless explicitly stated otherwise.

BRIEF DESCRIPTION OF THE DRAWINGS

Embodiments of the invention will now be described, by way of example, with reference to the accompanying schematic drawings, in which

FIG. 14 is a table presenting the distributions of data from different sources by class.

FIG. 15 is a table illustrating unigrams: single terms with no space.

FIG. 16 is a table illustrating bigrams: pairs of terms separated by space.

FIG. 17 is a schematic view of how a kernel calculates one of the output cells.

FIG. 25 is a table presenting best result for each model on Debricked test set.

FIG. 26 is a table presenting the AUC score for each model and test set.

FIG. 29 is a table presenting top word unigrams.

FIG. 30 is a table presenting top word bigrams.

DETAILED DESCRIPTION

Figures 1, 2, 3:
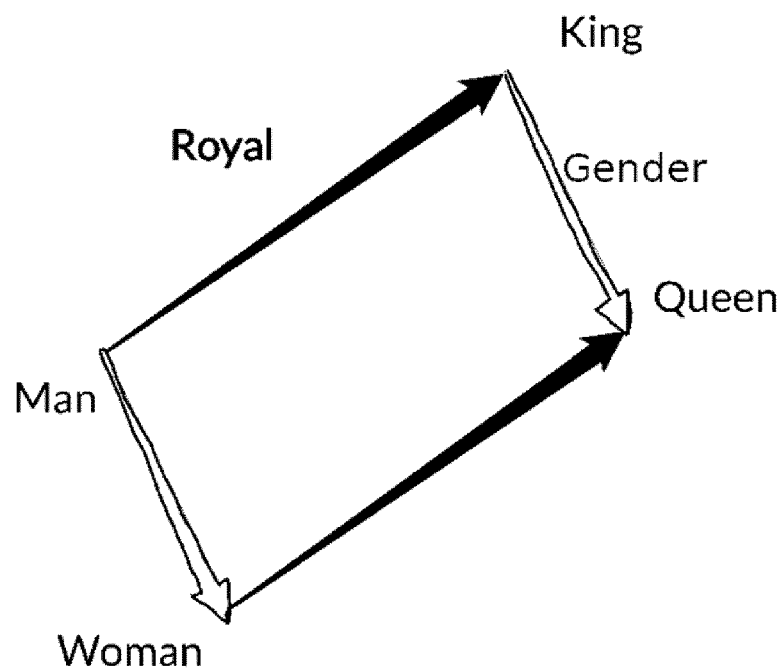
FIG. 1 is a table containing a truncated example of a security related example of data in training set and a non-security example of data in training set.
FIG. 2 is a schematic view of an example of one-hot encoded vectors.
FIG. 3 is a schematic view of an embedding representation of words in 2d.

The disclosure is divided into sections, in order: Theory, Method, Results, Discussion, and Conclusion. Theory handles the theoretical groundwork which the disclosure builds its approach on and discusses previous work that inspired this disclosure. A well-educated NLP data scientist should be able to skip this section. The following section, Method, describes the workflow and thought process from start to finish. Results presents the evaluation plots and tables. The predictions are made on several test datasets using both a baseline model from a recently published previous work with a Convolutional Neural Network (CNN) model and our own HAN implementation with and without Virtual Adversarial Training (VAT). The results are elaborated upon in the Discussion section. The methodology, approaches used, and the potential sources of errors are discussed in detail. In the Conclusion section, the disclosure reflects on how it has contributed to research, how these results can affect the industry, and what future work could improve the results and further advance the field.

Related Works
Security Identification

Zou et al. presents a model they call Security Bug Report Identifier (SBRer) [5]. The model is trained on labeled datasets and is specifically trained to detect security related bug reports from non-security related bug reports. SBRer uses both textual features and meta features to try to maximize the identification rate. The SBRer is trained on a dataset consisting of 23,608 bug reports from Bugzilla using three different open-source products; Firefox, Seamonkey, and Thunderbird. The results achieved by the SBRer was with the precision of 99.4% and a recall of 79.9%.

Behl et al. proposes a model that uses text mining approaches in combination with TF-IDF [6]. The model tries to predict the nature of a bug to decide whether it is a security bug report or not using naïve bayes.

Though there is various research and related work on identifying bug reports from non-related bug reports, the research found on detecting if a text talks about security-related issues were sparse.

A new study exploring the potentials of natural language processing for security topic classification was published by Palacio et al. [7], the creators of the Alpha SecureReqNet (SRN) model. The paper claims that the task of identifying security related texts is achievable but lacks benchmarks or comparisons with any previous works. The authors left a more extensive evaluation with several baseline models to be done in the future.

We took advantage of the opportunity to use their model as a benchmark neural network to compare our HAN model to. An open-source variant of the SRN model architecture is available for free online and contains most of the necessary code. SRN is a CNN as opposed to the more common recurrent neural networks used for problems in the text domain. CNNs have widespread use in image tasks but has not had the same levels of success in text tasks until somewhat recently. The theoretical background for CNNs can be found the section "Conventional Neural Network" as well as how text problems are structured and fed into CNN architectures.

Document Classification

HAN is developed specifically to work well for document classification and attempts to make the most of the sentence-based structure in text. It is built using attention mechanisms and RNNs [4].

Semi-Supervised Learning

There are several interesting SSL techniques. Most of these methods have been initially developed for image-based tasks in mind and some of them have been adjusted to work well with text-based problems. The purpose of SSL is to leverage the vast amount of unlabeled data that is often available for training better machine learning models.

Adversarial methods are popular way to improve a model by creating training data that is aimed to trick the classifier into making wrong predictions.

Adversarial Networks

Generative adversarial networks are one such scheme with a generator and a judge. The generator creates fake images to feed to the judge. Both generated images and real images are fed to the judge and the judge tries to predict what images are real [8]. This scheme improves both the generator and the judge in tandem. An alternative method that has found success on text problems is the discriminative adversarial network [9]. The network has a predictor and a judge and the predictor labels unlabeled data that it is fed and sends the annotated data to the judge. The judge must decide if the annotation was done by a human or by the predictor, leading to a similar adversarial problem that improves both predictor and judge.

Virtual Adversarial Training

Virtual adversarial training (VAT) is another method first developed with image tasks in mind that has found relevance in text problems [10]. VAT on text perturbs word embeddings in a direction that will have the highest chance of tricking the classifier into making the wrong prediction.

Self-Learning

Self-learning, also called pseudo labeling, is a method of having the classifier make predictions for an unlabeled dataset and then adding it into the pool of labeled training data with the classifier's annotation. This type of method incurs a certain risk of overfitting to a certain subset of data, but has had some recent success from Xuan et al. where it was used with a naive Bayes classifier for assigning the correct developers to each bug report [11].

Variational Autoencoders

Variational autoencoders have been used recently on the SSL text classification problem by Xu et al. with a promising degree of success [12]. The model consists of an encoder and a decoder. The encoder maps the input text to a latent space of lower dimension and the decoder is responsible for mapping values in this space back to human language. Encoding and decoding data can lead to loss, a reconstruction error, meaning that the input data will not be equal to the input data. In autoencoders, the encoder and decoder are made of neural networks aiming to learn the optimal encoding and decoding behavior by minimizing the reconstruction error. Variational Autoencoders build on the concept of autoencoders by regularizing the latent space so the decoder can be used on a random point in latent space to generate data of acceptable quality [13].

Theory
Language Model

Language modeling is a way of learning the innate structure of a language. Since language has a restrictive rule-set, the language model data is sparse. Most combinations of words do not form an acceptable sentence. There are many ways of building a language model for word representations. In this disclosure, 100-dimensional GloVe and SRN embeddings have been tried.

Word Representation

A simple word representation scheme is one hot encoding. It constructs a matrix with dimensions corresponding to the number of unique words and the number of input data. Each row contains the number one for each unique word that occurred in the input and zero for all other words. Since most words will not appear in any given text input, the matrix is sparse. This carries with it the curse of dimensionality as the representation becomes incredibly large with an increasing feature space.

Word Embedding

Word embedding is defined as language modeling and feature learning techniques in NLP that map symbols (words) into a vector space. This vector space has some desirable properties, such as similarity by angle and allowing dense representation. Dense representations generally have less computational cost than one hot encoding when working with large inputs and vocabularies. Since the dimensions are fixed, it does not suffer from the curse of dimensionality. Embeddings can represent the similarity or distinctness of words, often proving helpful in NLP tasks. Note the classic example:

The words "king", "man", and "woman" are selected. If we take the embedding values of "king" and subtract the embedding for "man" and add "woman" the result will be the embedding for "queen". It is noted that one aspect being measured is the royal attribute, the other is gender. Word embedding can learn to represent these attributes so that words with similar attributes are close in space of a given dimension. See FIG. 3 for a visual representation. This scenario assumes that one of the embedding dimensions has learned the attribute gender and one has learned the attribute royal.

The choice of dimensions for word embeddings is not necessarily intuitive. One may think that just increasing the dimensions of embeddings lead to better results, but more dimensions means a larger feature space. Many common pretrained embeddings available typically have about 50 to 300 dimensions [14][15].

It is common practice to randomize embedding initialization of words that are not in the vocabulary from a distribution with a certain mean and standard deviation. Randomly initialized embeddings are not much worse than pretrained embeddings for neural networks since the network will often learn the relations after some time regardless [16].

Figure 4:
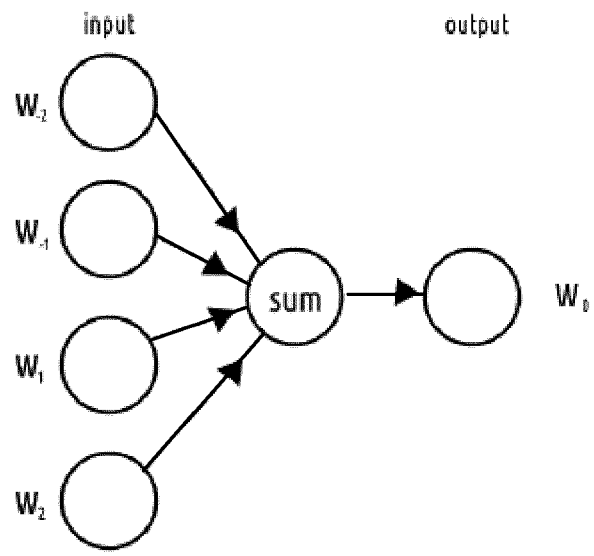
FIG. 4 illustrates a bag of words taking n words as input and calculates a prediction for which word is in the middle.
Figure 5:
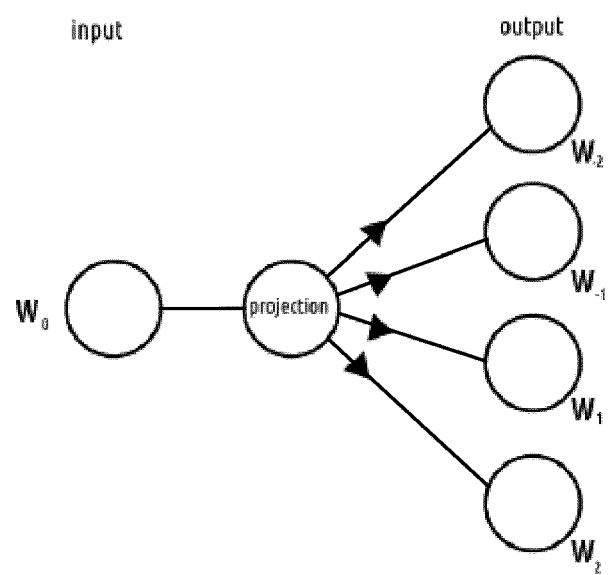
FIG. 5 illustrates skipgram taking one word and tries to predict the n surrounding words.

Two common methods used to train word embeddings are continuous bag of words (CBOW) and skipgram. CBOW uses the frequency of the surrounding words to predict a word, which means CBOW predicts a missing word from a given context. Skipgram, on the other hand, uses a given word to predict the surrounding words, meaning skipgram predicts the context given a word. See FIGS. 4 and 5 for an example.

Term Frequency-Inverse Document Frequency

Term frequency-inverse document frequency (tf-idf) is a calculation on how important a term t is to a document d in a corpus D. The basics of it is built upon two bases, term frequency (TF) and inverse document frequency (IDF). TF is the count of a term t in a document d. For a document d containing the term t i times, the basic approach to TF would be to use the number of occurrences i. Often an approach that takes into account the length of the document may be used, such as dividing the basic TF by the number of words in the document thus normalizing it for each document. To compensate that the TF emphasize more on common words, the IDF instead measures how much information the term provides by looking at the whole corpus. The IDF therefore emphasizes on the more interesting terms of the corpora, the terms which are more unique. The formula for IDF is $$\log \frac{|D|}{|\{d \in D : t \in d\}|} \quad (1)$$

where |D| is the number of documents and |{d∈ D:t∈d}| is the number of documents the term t appears in.

Figures 6, 7:
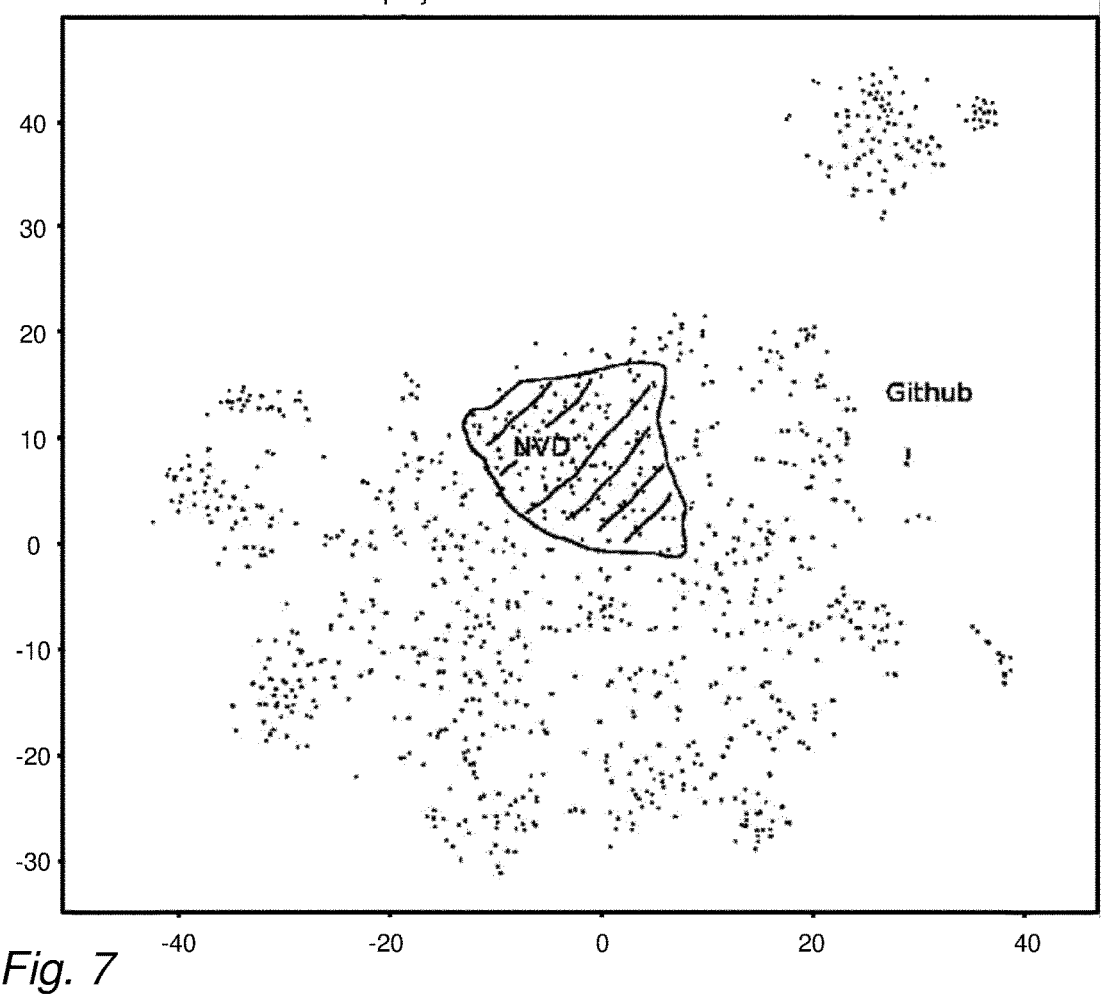
FIG. 6 illustrates a TF-IDF example with a simple term frequency (TF), inverse document frequency (IDF), and term frequency-inverse document frequency (TF-IDF).
FIG. 7 illustrates a t-SNE plot showing the clustered documents by Github and NVD source.

TF-IDF is the product of TF and IDF. An example of TF-IDF can be seen in FIG. 6.

Dimensionality Reduction

Dimensionality Reduction serves to find a representation for certain data that retains as much of the important information as possible, while reducing the number of dimensions. A more succinct representation allows for faster calculations. It can also improve human understanding of data through plotting the observations in 2 or 3 dimensions. In this section, a variety of methods and the theory for which these methods are based on is presented. The methods proposed in this disclosure are: Latent Semantic Analysis, T-Distributed Stochastic Neighbor Embedding, and Uniform Manifold Approximation and Projection.

Truncated Singular Value Decomposition

When working with highly sparse matrices, it is often desirable to reduce the dimensionality of the matrix and making it dense. One common way is to use Truncated Singular Value Decomposition (TruncSVD), to do both.

TruncSVD is an approximation of the Singular Value Decomposition (SVD) of a matrix, containing only the k largest singular values, where k is a value less than the number of columns of the matrix.

SVD is a commonly used linear algebra technique that factorizes a matrix into three matrices; a left unitary matrix, a diagonal singular values matrix, and a right unitary matrix. The formula for SVD is shown in equation 2.

$$M_{m \times n} = U_{m \times m} \Sigma_{m \times n} V_{n \times n}^T \quad (2)$$

The singular values matrix Σ is often listed in descending order, which is important when using TruncSVD. In TruncSVD, only the k columns of U and k rows of V are calculated. These rows and columns should correspond to the k largest singular values. TruncSVD thus relies on the truncated values being small enough for $M_{m \times n} \approx U_{m \times k} \Sigma_{k \times k} V_{k \times n}^T$ to be a good approximation. Using the obtained $U_{m \times k}$ to represent the matrix will finalize the reduction and making it dense, giving the truncated matrix the same number of rows as the original matrix.

Latent Semantic Analysis

Latent Semantic Analysis (LSA) is an NLP technique with the purpose of analyzing text documents and extracting useful data. The technique first uses term weights, in this case they have been calculated as a sparse tf-idf matrix of word weights. This matrix is transformed into a dense matrix through dimensionality reduction, in this case Truncated SVD. The theory behind tf-idf and Truncated SVD will be elaborated upon below in greater detail. LSA works under the assumption that the distributional hypothesis holds; words that occur in similar contexts such as documents are inherently similar in meaning. In the case of this disclosure, documents from NVD should possess a discernibly different context than Github issues. Therefore, the distributional hypothesis is assumed to hold for the purpose of this study.

T-Distributed Stochastic Neighbor Embedding

T-Distributed Stochastic Neighbor Embedding (t-SNE), is a dimensionality reduction technique commonly used to visualize high dimensional data.

Figure 8:
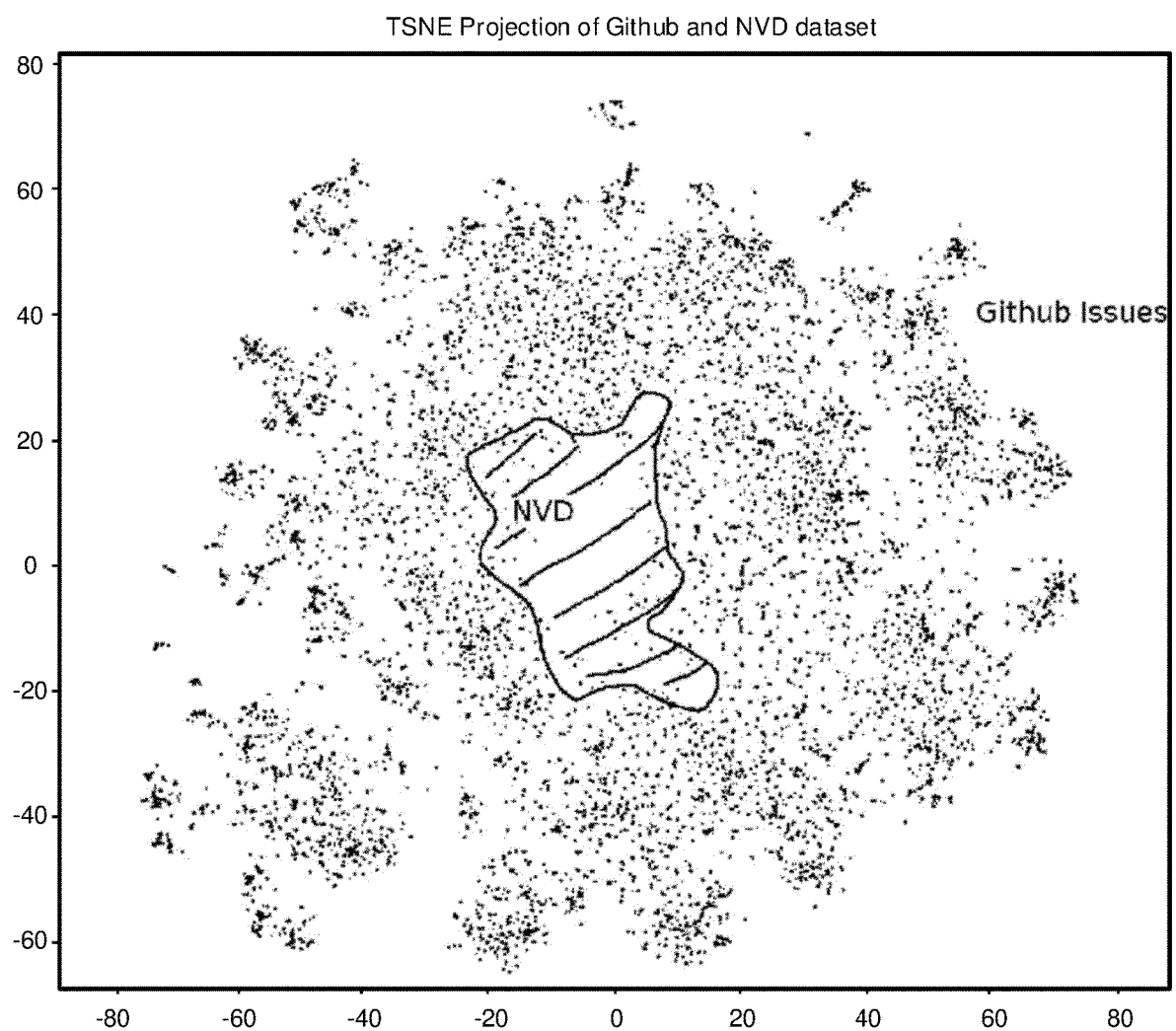
FIG. 8 illustrates a t-SNE plot showing the clustered documents by Github and NVD source with 1000k observations.

T-SNE is used to plot and display the data clusters in a meaningful way. FIG. 8 uses t-SNE to properly display the clusters.

Uniform Manifold Approximation and Projection

Figure 9:
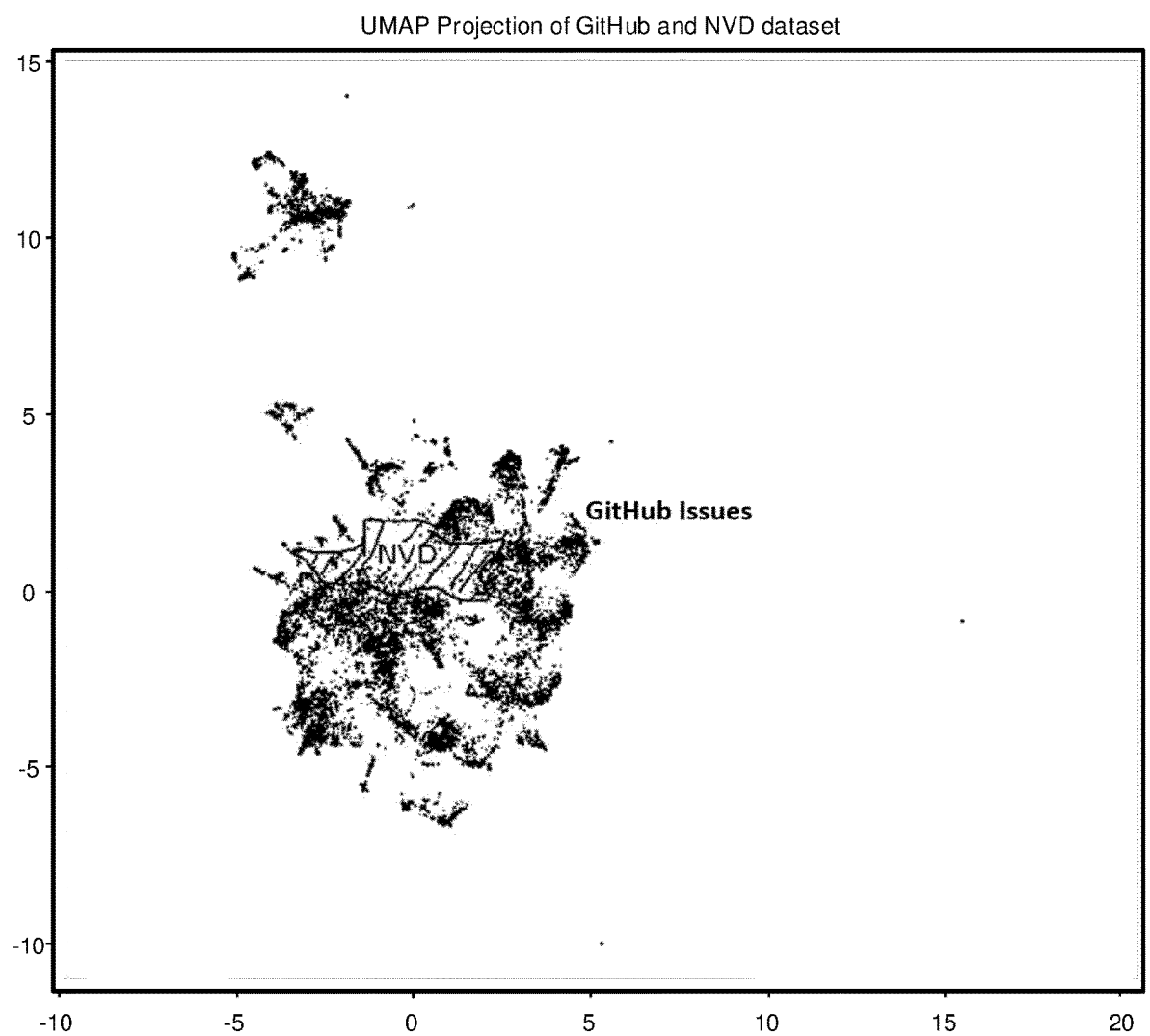
FIG. 9 illustrates a UMAP plot showing the clustered documents by Github and NVD source.

Uniform Manifold Approximation and Projection (UMAP) is a more recent dimensionality reduction technique that aims to optimize the mapping from a higher plane into two or three dimensions for visualization [17]. This method is still quite new and does not provide the same level of quality assurance when compared to a technique that has been in use for a longer period of time. The creators of UMAP claim that UMAP " . . . is demonstrably faster than t-SNE and provides better scaling" [17]. This claim is in line with the observed calculations times for t-SNE and UMAP in this disclosure, as can be seen in FIG. 9. The observations are more closely clustered than in TSNE, which gives a better representation of the data.

Introduction to Machine Learning

Figure 10:
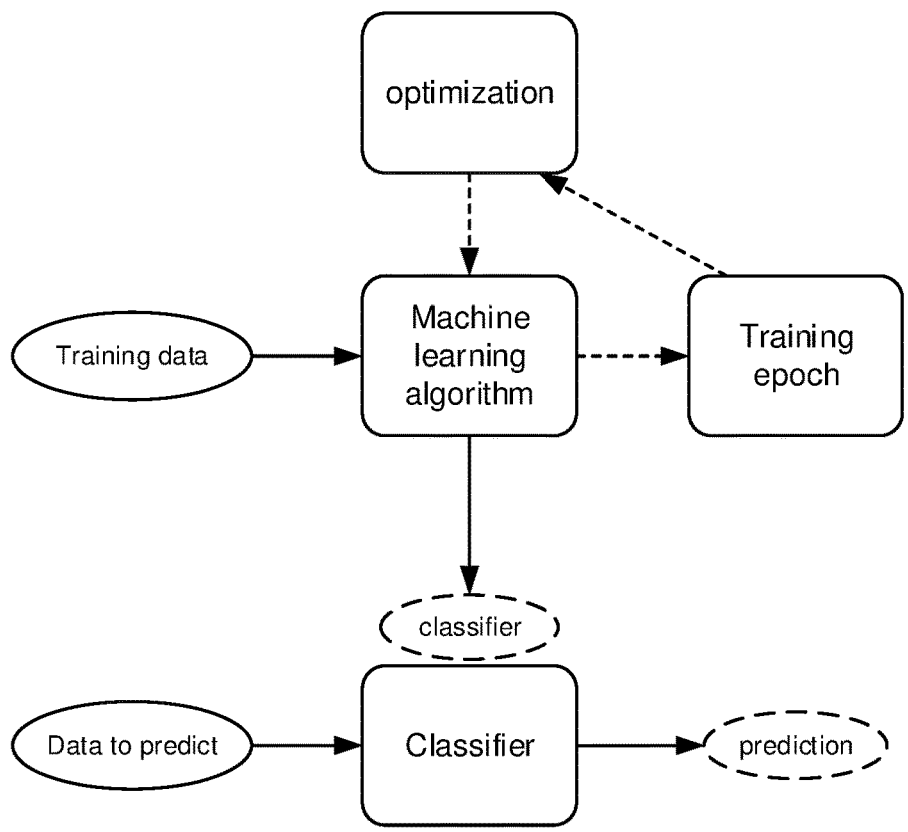
FIG. 10 is a schematic view of a machine learning system.

Machine learning has been regarded as magic by the uninformed. This section aims to demystify the concept of machine learning and better explain the fundamental concepts required to understand a paper in machine learning. The core concepts that will be covered are: types of machine learning, overfitting and underfitting, batches and epochs, activation functions, optimization, and hyperparameters. In FIG. 10, the solid line ellipses symbolize input to the system, the boxes are the system itself, and the dashed ellipses are the output. The classifier is created using the machine learning algorithm and is a product of training. The classifier is then used in the following figure as an independent system which takes new data as input and outputs a prediction.
Supervised, Unsupervised, and Semi-supervised Learning Supervised learning is one of the most common ways to approach machine learning. Each observation in the training set contains both training data and a corresponding label. The model is then trained on these data-label pairs, making the model learn how to classify new observations without the label after the training. During training, the model updates its parameters based on the results.

Unsupervised learning on the other hand does not have access to any labels. It tries to learn from the data's internal structure. Example of common unsupervised learning methods are word embeddings, as explained in section "Word Embedding", and clustering, which is explained in the next subsection.

Semi-supervised learning tries to use a combination of supervised learning and unsupervised learning to make the model better, by making use of both labeled and unlabeled data during training. The reason why semi-supervised learning is interesting is because it is tedious to label data and there exist a lot of unlabeled data freely available on the internet.
Clustering The core principle of clustering is to group observations into separate categories. Clustering can be useful for finding patterns or groupings that a human would not normally find through more intuitive approaches of categorization. There are various ways of clustering observations. One of the most common forms of clustering in data mining is the simple k-means clustering approach. K-means clustering is determined through setting k cluster centers and then calculating the nearest cluster for each observation. The nearest cluster is the cluster center whose mean (from the observation) has the least squared Euclidean distance. When the clusters have formed, each cluster has its center recalculated as the center of all of its observations. Each point is then reassigned to the nearest cluster (not necessarily the same as last iteration). This process continues either until a certain number of iterations have passed and may or may not converge. There is no guarantee for the convergence to reach a global optimum and as such, results may vary depending on initial cluster center allocation. Each observation is assigned to the cluster with the least squared Euclidean distance mean, that is the cluster whose points are closest on average to the observation to assign to a cluster.
Overfit and Underfit A machine learning model is tasked with learning from the input data available to it. The patterns the model constructs to describe the data can overfit or underfit. Overfitting occurs when the model learns very complex patterns in order to perfectly fit the training data. This results in a model that will perform very well on the training data but will fail to generalize to new and unseen data. Overfitted models have high variance, meaning that small differences in data will yield widely different results because the model has not learned the overarching patterns in the data and instead learns random noise. In contrast, the model can also underfit the training data, meaning that it learns too little from the training data. This results in high bias, making broad erroneous assumptions about the data by learning simplistic patterns. The trade-off in bias and variance of a model decides the ability to generalize to new data as well as the complexity of patterns learned. A method called dropout is commonly used to reduce overfit.
Batches and Epochs When using a dataset in a neural network model, it is often good to split the dataset into smaller batches. A batch contains a fixed amount of observations, usually chosen to the power of 2. The last batch of a set may be unbalanced.

Figure 11:
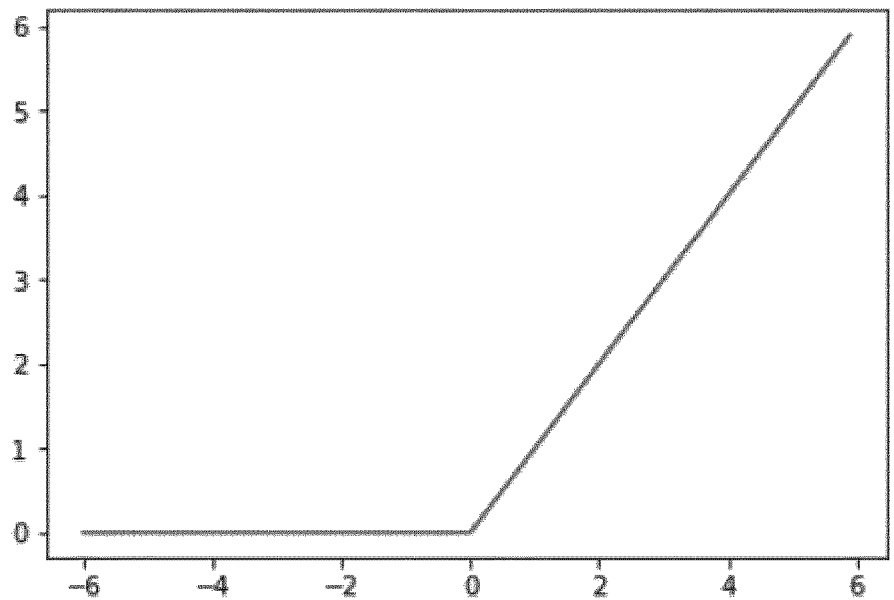
FIG. 11 illustrates a ReLU function.

Passing an entire dataset forward and backward through a network once is called an epoch. During training, multiple epochs are usually performed.
Gold Standard Ideally, a ground truth should be used for evaluation of a machine learning model. Ground truth is the absolute truth, which will rarely be observable information. A gold standard is a dataset which aims to represent the underlying ground truth as accurately as possible. In the case of this disclosure, the gold standard has been labelled manually by humans with some expertise in the field of computer security and will be assumed to be correct for proper evaluation. The main purpose of the gold standard is to ensure a high degree of certainty that a classifier's evaluation can be trusted. Ground truth and gold standard are often used interchangeably in the machine learning field but will be referred to as gold standard below.
Activation Function An activation function in the context of neural networks, is the function each node has that takes the inputs to the node and calculates the output from the node. The purpose of the activation function is to introduce non-linear behavior. The choice of activation function can greatly impact the way a neural network works. The following activation functions may be used.
Rectified Linear Unit Rectified Linear Unit or ReLU is a function that is zero for all negative input values and linear for all zero and positive values as seen in FIG. 11, meaning that the activation is sparse. With fewer neurons sending a non-zero output, the network is more lightweight and less computationally expensive. The function is also computationally cheap and converges quickly as the function doesn't taper off at large input values. This means it will not suffer from the vanishing gradient problem.

$$f_{ReLu}(x) = \max(0, x) \quad (3)$$

Softmax Function

The softmax function is also called the normalized exponential function. The function takes a vector of real numbers and as the name suggests, normalizes them so the sum of the vector is 1. The vector then represents a probability distribution, proving quite useful when outputting a prediction from a multiclass classifier problem.

The input vector z has length K:

$$\sigma(z)_i = \frac{e^{z_i}}{\sum_{j=1}^{K} e^{z_j}} \quad (4)$$

$$i = 1, \ldots, K$$

$$z = (z_1, \ldots, z_K) \in \mathbb{R}^K$$

The probability distribution has sum of 1 meaning that the probability vector covers all outcomes:

$$\sum_{i=1}^{K} \sigma(z)_i = 1 \qquad (5)$$

Sigmoid Function

Figure 12:
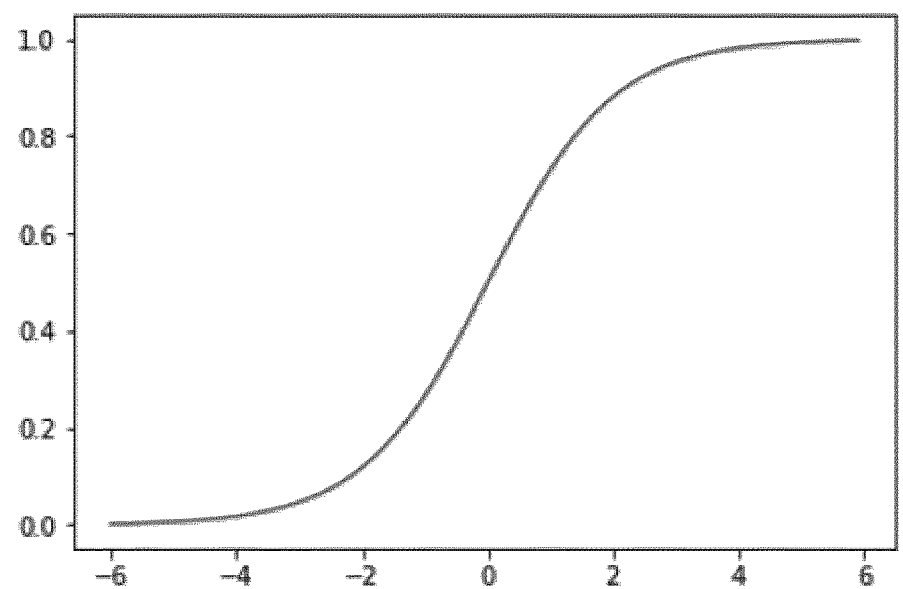
FIG. 12 illustrates a sigmoid function.

The sigmoid function is bounded, meaning that the maximum and minimum y values are finite. It also only has positive derivatives at every point, giving it a characteristic sigmoid curve shape as illustrated in FIG. 12. Sigmoid functions are common in binary classification problems as a final layer to get a binary output. There are many sigmoid functions, the one used in this disclosure is the logistic function, having the following formula:

$$f_{Sigmoid}(x) = \frac{1}{(1 + e^{-1})} \qquad (6)$$

Backpropagation

Backpropagation (BP) is a commonly used algorithm during training in machine learning. It uses the weights of the model to efficiently compute the gradient of the loss function for a single sample. The algorithm works by calculating the gradient of the loss function in respect of each layer's weight using the chain rule, iteratively going backwards from the end layer-wise. This is an efficient way to calculate multi-variable derivatives.

Evaluation Metrics

Figure 13:
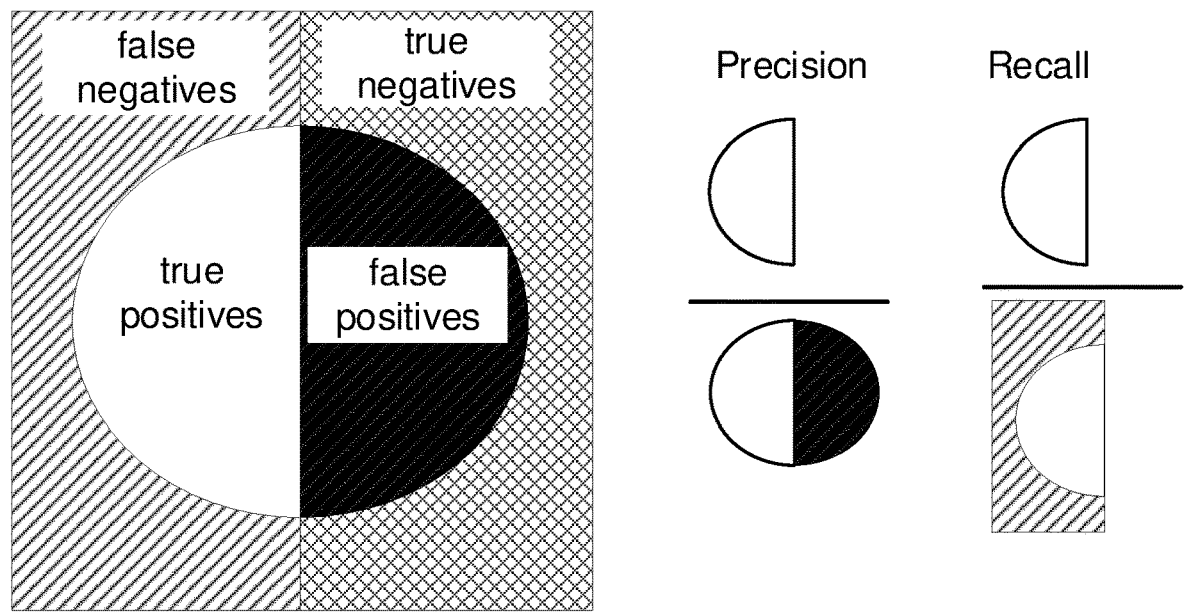
FIG. 13 is a schematic view of instances of different classes.

Evaluation of model predictions is first measured and divided into true positives, false positives, true negatives and false negatives. True positives $t_p$ is the category of positive predictions that are actually from the positive class. False positives $f_p$ are incorrectly predicted as the positive class but is actually an element of the negative class. In the same vein, true negatives to are negative predictions that are correct and false negatives $f_n$ that are incorrectly predicted as negatives but are from the positive class. Precision and recall are explained in FIG. 13.

Precision is the measurement of correct predictions compared to the total predictions.

$$\text{Precision} = \frac{t_p}{t_p + f_p} \qquad (7)$$

Recall is measured as the detected elements of the class in proportion to the total scope of the class.

$$\text{Recall} = \frac{t_p}{t_p + f_n} \qquad (8)$$

F1 score can be calculated with different formulae, the following formula expresses the traditional F1 score function that was used in this disclosure, calculating the harmonic mean of precision and recall.

$$F1 = 2 * \frac{\text{precision} * \text{recall}}{\text{precision} + \text{recall}} \qquad (9)$$

Optimization

Stochastic Gradient Descent

Gradient descent is defined as the minimization of the objective function $f(\theta)$ where $\theta$ is the model's parameters. The gradient is calculated at each iterative step and the parameter $\theta$ is updated in the opposite direction of the gradient by an amount based on the learning rate.

The learning rate controls the scale of updates to the weights. A lower learning rate value leads to smaller weight changes and slower convergence towards the optimum. A higher learning rate converges faster, but at a greater risk of overshooting the target and in the worst case not converging at all. The intention in gradient descent is to reach the global minimum. There are several issues that can arise in gradient descent, such as getting stuck in a local minimum during optimization. If the learning rate is too high, it is possible that the algorithm will not reach a minimum as the changes each iteration may be too large. In contrast, a low learning rate leads to slow optimization and risk of underfitting.

In machine learning, stochastic gradient descent (SGD) is primarily used. It is a stochastic approximation of gradient descent, replacing the gradient with an estimation of it. In SGD, the gradient is calculated using a random subset of the data, instead of using the entire dataset. Backpropagation is used to efficiently compute this gradient.

There are many SGD optimization algorithms and some popular algorithms will be mentioned in this section. For further reading, refer to the gradient descent optimization overview by Ruder [18].

The Adaptive Gradient algorithm (AdaGrad) [19] has the learning rate adjusted for each parameter. Infrequent parameters have a higher learning rate for more substantial updates. Frequent parameters instead have lower learning rate, leading to smaller updates but more frequent iteration. This method achieves good performance on sparse gradients such as nlp tasks [18].

Root Mean Square Propagation (RMSProp) similarly to AdaGrad, has per-parameter learning rates. The learning rates are adjusted based on the first moment or mean gradient.

Adam

The optimizer primarily used in this disclosure is the Adam optimizer proposed by Kingma and Ba [20]. Adam is short for adaptive moment estimation, building on the fundamentals of AdaGrad and RMSProp. In Adam the optimizer calculates the mean gradient like in RMSProp and additionally the second central moment or variance gradient. The combination of these two calculations are used to change the parameter learning rates. The exponentially decaying averages of the first and second moment of the gradients from previous iterations are calculated as following:

$$m_t = \beta_1 * m_{t-1} + (1-\beta_1) g_t$$

$$v_t = \beta_2 * v_{t-1} + (1-\beta_2) g_t \qquad (10)$$

m is the mean (first moment) and v is the uncentered variance (second moment). $\beta$ is the decay rate for each equation. $\beta$ close to 1 corresponds to very slow decay.

There is bias-correction that accounts for a bias towards zero for the m and v vectors as they are initialized as zeroes. The first and second moment are estimated to:

$$\hat{m}_t = \frac{m_t}{1 - \beta_1^t} \qquad (11)$$

-continued $$\hat{v}_t = \frac{v_t}{1-\beta_2^t}$$

The updated parameters $\theta_{t+1}$ are derived from the following equation utilizing the first and second moment in addition to the learning rate $\eta$ and the smoothing term $\beta$:

$$\theta_{t+1} = \theta_t - \frac{\eta}{\sqrt{\hat{v}_t}+\epsilon}\hat{m}_t \qquad (12)$$

Hyperparameters

Parameters used in machine learning can be divided into two categories: mutable and immutable. The property describes the parameters' ability to change during training.

Parameters are either derived during training or set in advance. The ones specified before training begins are called hyperparameters. Some hyperparameters may also be mutable. Some common hyperparameters for neural networks are learning rate, batch size, number of epochs, and number of cells in each layer. Learning rate is typically set to a certain value before training and in some cases uses learning rate decay with each epoch during training. This results in the model quickly adapting during the early stages of training followed by a more controlled convergence towards the optimum.

Data

In machine learning tasks, the data is an essential part of the problem statement. In the case of vulnerability detection in text, there are several questions that must be answered before considering the usage of NLP. The entire research process is documented and divided into sections, including the Data chapter and Models chapter. Data Acquisition describes how the data was gathered. Next, some of the data is annotated for future use in Data Annotation. Exploratory Data Analysis refers to the practice of learning useful patterns in the data.

- Data acquisition: is it possible to gather data of sufficiently large quantities to effectively use machine learning?
- Data annotation: what restrictions limit data annotations and what annotations guidelines should be used?
- Data cleaning: what information is important in the data and what should be filtered out?
- Exploratory Data Analysis: do patterns exist in the data? Can the problem statement be answered with the type of information available?
- Examples of data samples can be found in FIG. 1.

Data Acquisition

Our unlabeled data is scraped from Github and National Vulnerability Database. The Common Vulnerabilities and Exposures (CVE) and Common Weakness Enumeration (CWE) descriptions from the National Vulnerability Database (NVD) can safely be considered security related.

The data from Github consisted of publicly posted issues from popular repositories. The issues were often user submitted and described the topic with varying degrees of precision and with differing levels of comprehension of the English language. Some issues were not in English. The issue data could be considered highly variant overall. The data from NVD in contrast to the Github data, was incredibly consistent in vocabulary, overall language, and format. Note that these descriptions are quite different from issue descriptions on Github. The differences in these texts were to be evaluated in the following section, which deals with providing a better understanding of the data.

A substantial labeled dataset, User Labeled Test Set, from the SRN paper is used [7]. This set was generated through combining NVD data with Github and Gitlab issues labeled as security related or not. Note that an overwhelming majority of security related data is from NVD.

Since there is a risk that the model is trained to predict if a text comes from Github, Gitlab, or NVD instead of if the content is security related, the test sets used contain only Github data. More security issues from other sources than NVD could improve the training results as the domains will be more similar in regards to testing and training.

Data Annotation

Proper evaluation of the models requires labeled data to test against. Firstly, the SRN dataset is split into train, validation, and test sets. The test set, as previously mentioned, only contains data from Github.

While these sets should be sufficient, over 1000 Github issues were annotated manually to have a gold standard to test against. It was discovered that few issues on Github are actually security related, around 1% were actual vulnerability reports. It was settled on creating slightly different annotation guidelines that valued potential security risks as security related. This came to include for example issues about crashes and memory leaks. Since this problem statement or test set is quite different from the training and validation data, one could expect these results to be significantly worse than the other test set, derived from the same annotation guidelines as the training data.

Manual human labeling was required to create a gold standard. Instructions on how to annotate were specified to keep the annotations consistent with several annotators. Refer to section "Annotation Guidelines" for details. The annotation policy has five categories with an ascending associated risk for each category. The highest risk is the Vuln category which contains known exploits and user reported vulnerabilities. The next category, Risk, contains memory leaks, unrestricted user inputs, access violations among others. In the safest categories, the subject matter covers for example design and questions unrelated to code.

In order to address the issue of few security related texts, different methods of sampling from the unlabeled dataset were used. The first 300 entries were extracted using uniform distribution sampling. The next method of sampling used the previously described tf-idf document source scoring. Lack of labeled and categorized data necessitated this method but note that it is biased.

Annotating if a text is about security was not always straight forward, since it requires more domain specific understanding of the meaning of the issue. For example, the problem of annotating if a text is positive, negative, or neutral should be a much easier task and as such, result in high annotation similarity. Having established that the problem was difficult to annotate for the two annotators, this is a source of potentially inaccurate data for the model. When annotations were made for the same data, the annotations were compared and discussed. Later on, this process was automated, and the higher risk annotation value was chosen when conflicting annotations were made.

Data Cleaning

After accumulating the labeled data that is needed, the next step is cleaning the data. In order to properly read the data, it needs to be tokenized. Tokenization is a process that splits the text strings into tokens, with the resulting tokens being for example words and punctuation. Without cleaning the data first, it would be difficult to know where the string should be split. The primary focus of data cleaning should be to allow for as useful tokens as possible.

- Words that are connected to punctuation should still end up as the correct base word. Example: "word." should be split into "word" and ".".
- Non-English text: The model that is built will not be trained to understand any other languages than English and will only use English embeddings, therefore, all documents that contain non-English characters, such as Cyrillic script or kanji are discarded.
- Documents that contain only a few words or too many words are removed as they are deemed to not contain important information. There is a lower limit to how useful a few words can be. The lack of substance in the outliers was empirically evident and they were removed from the training data.
- Code segments were removed in the capacity that was possible, but it is possible that other models are able to take advantage of this type of text. This aspect was considered outside the scope of this study.

Exploratory Data Analysis

With machine learning problems, it is essential to understand the training data used to learn to solve the problem. The techniques that were utilized in this step include clustering, plotting the clusters utilizing dimensionality reduction, n-gram counting, and tf-idf scoring.

Distributions

The Github data was first uniformly sampled and annotated for the purpose of understanding of the data. Unbiased sampling may help to understand the distributions of various data types. From the issues that were annotated, it was observed that staggeringly few observations were even vaguely related to computer security. With this in mind, the definition of security related text was initially decided to be somewhat lenient and inclusive. The issue of unbalanced data distributions will be elaborated upon in the Discussion section. The efforts to cluster the data with t-SNE and UMAP indicated that the Github and NVD datasets were decidedly different. FIGS. 8 and 9 show that NVD and Github observations are mixed. Ideally, the security related Github issues would all be clustered with various NVD dominant clusters and the safe issues would be completely separated. Most common words in these clusters can be seen in the appendix.

A variety of biased sampling methods were tried in order to receive more balanced distributions. Meta data and features were extracted from NVD data in order to find meaningful descriptors for computer security. This was accomplished by incorporating top word n-grams extraction and calculating tf-idf vectors to learn word weights for computer security related contexts. With these features, the biased sampling was possible.

N-Grams

Uni-grams, bi-grams, and tri-grams were extracted from two distinct sources: Github and NVD. The n-grams from these sources were extracted both from the raw sources and cleaned sources. The n-gram sets were compared to find patterns in the language used in these sources as seen in FIGS. 15 and 16. Complete lists of n-grams can be found in the Appendix. After comparing the two sources, the common n-grams in Github issues that are not common in NVD were removed from NVD n-grams. The goal is to filter NVD n-grams to only contain security related n-grams. The NVD security n-grams filter the Github issues and remove any issues not containing security n-grams. The result was a dataset with a high degree of vaguely security related issues. This process creates insight into the data that will be learned from in the training stage. The n-gram filtered dataset can be used at later stages as training data if it is of high quality, which can be ascertained by manually checking a uniformly sampled subset.

Document Similarity Scoring

One sampling method that was attempted was tf-idf document source scoring. Previous work could not be found in academic papers, but it was considered an interesting experimental approach for ranking the relevance of a document. Tf-idf scoring firstly calculates tf-idf vectors on the corpus corresponding to each data source and normalizes the vectors using the l1-norm. The averaged sums of the tf-idf vectors produce an averaged tf-idf vector. Each issue from Github is then scored with each of these vectors and the tf-idf vector that produces the highest score is chosen as the issues' source. The issues that were predicted to derive from NVD but were actually from Github were considered interesting and sampled out. The documents with a score lower than the median were discarded as being irrelevant and scores that were too similar between the Github score and NVD score were also discarded. The NVD tf-idf score as such had to be distinctly higher than the corresponding Github tf-idf score. The tf-idf score describes the amount of corpus specific terminology the text contains, which enabled finding documents that are as unique as possible. These samples were found to contain a substantially higher proportion of security related issues.

Models

The Baseline section establishes a simple initial document classifier model to see if the problem statement seems solvable with NLP. Following the baseline implementation, more complex models are constructed in neural networks. Finally, the evaluation process for model comparisons is described.

Baseline

It is pervasive within machine learning to create a simple baseline early in the development phase in order to form some initial assessments about the problem's nature. The baseline model should primarily be used to explore how difficult the chosen problem. The baseline model will also provide a base for comparison with more complex architectures.

Logistic Regression

A binary logistic regression classifier on tf-idf vectors was chosen in order to establish what a basic model could achieve in terms of classification strength. Later on, the more complex models will be compared to this classifier in order to gain context as to how it performs. A neural network will often perform better than a logistic regression classifier, but it cannot be assumed to be true.

Silver Standard

The data annotations needed for the project is difficult to outsource as expertise in the computer security domain is required. It was quickly ascertained that a silver standard of high quality is essential to compensate for the lack of outsourcing. A logistic regression classifier was trained on a subset of the gold standard and evaluate on another subset. The classifications demand a high degree of certainty; probability scores above 95% or below 5% were chosen. It was deemed that 5 percent data uncertainty was low enough that the mislabeled data will largely be ignored or not have a large impact on the training. These silver observations are then added to the training pool together with a small subset of NVD-data labeled as security-related. The model is then retrained using the new training pool as its training input. This iterative process improves the model slowly while building a silver standard.

The silver standard generated through the logistic regression pseudo labeling was not used to train the neural network in the end. The gold standard training data used to acquire the silver standard could not be used for testing as it was biased and had been seen by the logistic regression model. In the end, a larger test set was prioritized over a silver standard training set in order to improve confidence in the evaluations.

The silver standard generated through the use of issue tags and NVD data also possesses some bias since it is in part derived from user reported vulnerabilities and does not contain unreported vulnerabilities.

Model Architectures

It is intended to further expand on security text classification with a different NLP approach, specifically the Hierarchical Attention Network (HAN) architecture built on RNNs and attention mechanisms. While the problem statement is similar to the previously discussed SRN study (Palacio et al., 2019), the purpose is to explore alternative solutions to this problem, evaluate on a proper gold standard annotated by us, and put the task into context through benchmarking. With an implementation of the SRN model at hand, benchmarking and proper evaluation can be found in the Results chapter 6. It is also intended to lay some ground-work for SSL approaches. The Model Architectures section covers the theoretical basis for the neural networks implemented, specifically CNN, HAN, and VAT.

Conventional Neural Network

Convolutional Neural Networks were initially developed for the computer vision domain. Like many other machine learning techniques, CNNs have been adapted for the text domain with great success. It has been shown to be effective on the text domain to a similar degree as LSTMs and GRUs [21][22].

CNNs use a kernel to mask over the input data and output a single value at each step as seen in FIG. 17. The weights of the kernel are used to calculate the output value. In the case of CNNs in NLP, the kernel size is typically limited to word n-grams (a number of words) by the number of embedding dimensions.

CNNs can be tricky to hyperparameter tune successfully, for more information on good practices refer to the article by Zhang and Wallace [23].

Attention

Attention originated from the sequence-to-sequence modelling problem, such as machine translation, in the text domain. Previously, sequence-to-sequence problems were often solved by using an encoder and decoder on an input sequence and predicting a fixed length output sequence. An encoder is responsible for mapping the words of a sentence into a fixed length context vector in another space. The decoder receives the vector and maps it back to natural language space. The encoder and decoder are neural networks. The fixed length restriction in this approach was shown to decrease performance when used on longer sentences.

Attention in its first iteration [24] predicts one word at a time while only looking at the subset of the input sequence with most perceived importance. Attentions has an encoder and a decoder, but the decoder takes a context vector like previously, only this time it takes a context vector per word instead of per sentence. In this implementation, the attention layer is built with a bidirectional LSTM and therefore combines hidden states forward and backward.

A myriad of variants have been developed since attention's inception, including the self-learning variants, for example the Transformer architecture [25].

Hierarchical Attention Network

Figures 18, 19:
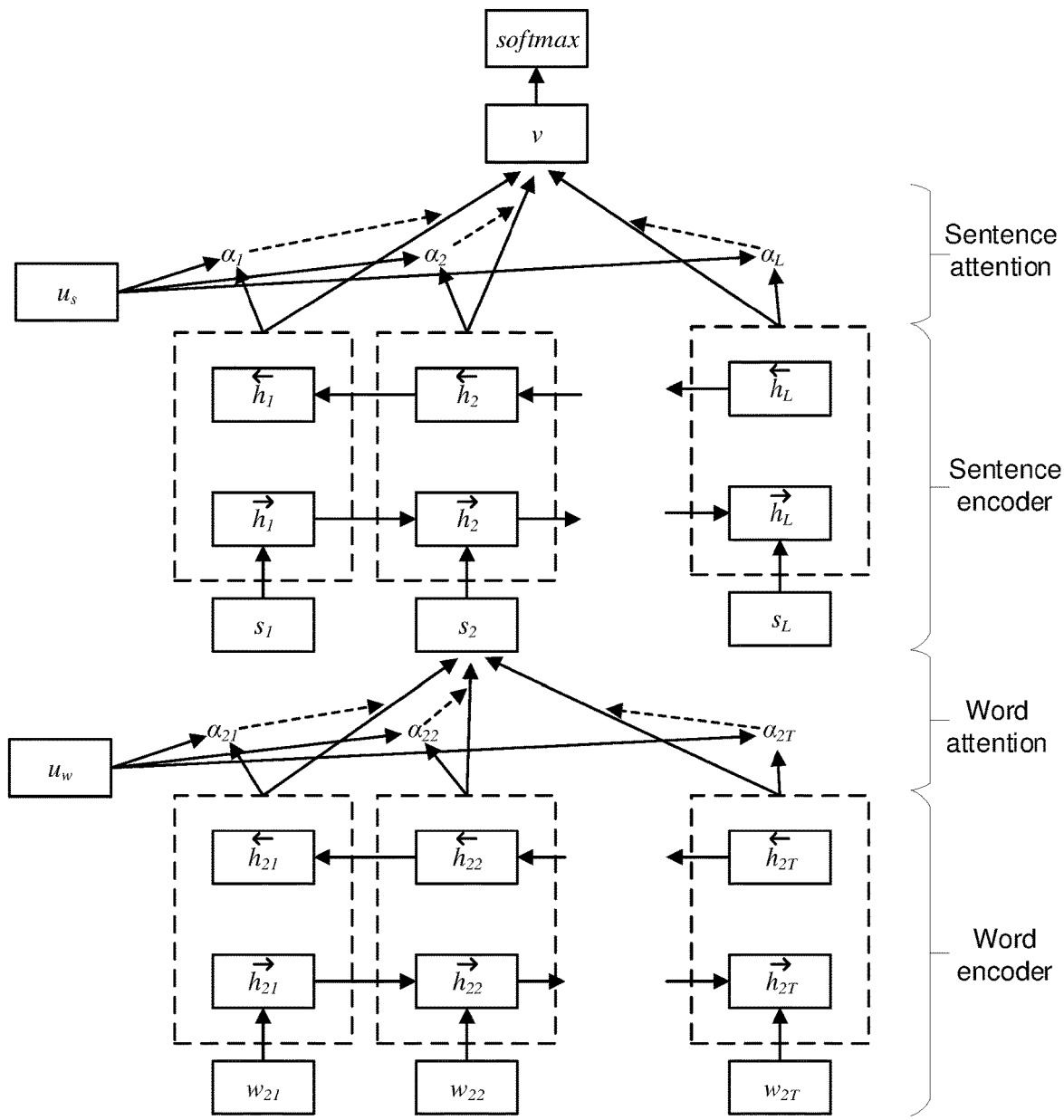
FIG. 18 illustrates an example of attention mechanism both for word level and sentence level attention.
FIG. 19 illustrates the structure of HAN.

Hierarchical Attention Network (HAN) for document classification was first introduced by Yang et al. [4]. The paper proposes a model based on a hierarchical structure that tries to mirror the structure of a document, by having one level focusing on the words and one level focusing on the sentences. The implementation of HAN used is based on the model described by Yang. A word encoder embeds the words into vectors, which are then passed on to an attention layer that extracts the most meaningful words for the sentence into a summarized sentence. It is noted that characters could be used to generate the word vectors as an additional level instead of directly using word embedding. The sentences go into a sentence encoder followed by a sentence level attention layer. The sentences build a succinct document vector representation. Both levels of the structure consist of one encoder and one attention layer. The output of the model, which is a document vector, then goes through a softmax layer to get a probability for the classification task. This structure can be viewed in FIG. 19.

The main model investigated in this disclosure uses a HAN classifier, using LSTM as encoders and simple attention with context as its attention layers.

The first layer of the HAN architecture is the word encoder. Just like the first attention variant by Bahdanau in 2014, HAN uses a GRU sequence encoder. A GRU has two types of gates: the reset gate and update gate. The purpose of these gates is to modify the hidden state transition. The update gate controls what is kept and removed from the old state as well as what information to add when updating to the next state. The reset gate controls how much information from the previous state to forget [26].

Following the word sequence encoder, the output is passed into a word-level attention layer. For HAN, the authors engineered attention with context [4] to use the " . . . context to discover when a sequence of tokens is relevant rather than simply filtering for (sequences of) tokens, taken out of context.". The word annotation hit is inputted into a one-layer multilayer perceptron with weight $W_w$ and bias $b_w$ to extract the corresponding hidden state $u_{it}$, using tan h as the activation function. The weight $\alpha_{it}$ is calculated with a word-level context vector $u_w$ attention scheme and is normalized with a softmax function. Lastly, a sentence vector $s_t$ is computed as a weighted sum of the word annotations and their calculated weights. Attention with context can be viewed in the following equation.

$$u_{it} = \tanh(W_h h_{it} + b_w) \tag{13}$$

$$\alpha_{it} = \frac{\exp(u_{it}^T u_w)}{\sum_t \exp(u_{it}^T u_w)}$$

$$s_i = \sum_t \alpha_{it} h_{it}$$

It is possible to generalize this approach to character and sentence level attention as well. In the case of sentence attention, which is used in HAN, the final output is a concise document vector.

The document vector is used for document classification using a softmax function.

Semi-Supervised Learning

Most neural network models are using supervised learning, which are trained with already labeled data. For every data instance fed into the model during training, the data have a corresponding label attached to it. Semi-supervised models differ in that additionally to the labeled observations, they try to take advantage of unlabeled data as well.

The main semi-supervised learning approach tried in this disclosure is Virtual Adversarial Training (VAT). VAT is a regularizing method modifying the loss-function, making it deployable in an existing model. To better understand VAT, basic Adversarial Training (AT) is first explained.

Adversarial Training

Adversarial Training is a supervised method based upon creating adversarial examples. It was first introduced by Goodfellow et al., 2014 [27]. The adversarial examples are created by modifying existing examples with a small perturbation in a direction that makes the model miss-classify the adversarial example with as high degree as possible. The idea behind the method is to use observations that are very close in input space, but very far away from each other in the model output space. If these points exists and the model haven't trained with adversarial examples, then there exist small perturbations that will make the classifier misclassify by adding the perturbation to the example. By letting a model train on these adversarial examples the model can learn to regularize and generalize better. These perturbations are often too small for a human to notice.

Adversarial Training modifies only the loss function, making it applicable on already existing models. Denote x as the input, y as the label paired with x, $\theta$ as the parameters of the model, $\hat{\theta}$ as the parameters with a backpropagation stop, and r as a small uniformly sampled perturbation with the same dimension as x. The E is a hyperparameter that restricts the absolute value of r. The adversarial loss $L_{adv}$ can then be viewed in the equation below. Stopping the backpropagation in B means that the backpropagation algorithm should not be used to propagate the gradients in the case of $\hat{\theta}$.

$$L_{adv}(\theta) = -\log p(y \mid x + r_{adv}; \theta) \qquad (14)$$

$$r_{adv} = \arg\min_{r, \|r\| \le \epsilon} \log p(y \mid x + r; \hat{\theta})$$

Virtual Adversarial Training

Virtual Adversarial Training (VAT) is an extension on Adversarial Training making it accessible in a semi-supervised environment [28]. It works similar to Adversarial Training, but instead of using the labels to determine how the perturbation should be created, it tries to follow the direction of the gradient using an approximation. This is done by calculating the Kullback-Leibler divergence ($D_{KL}$) between the probability distribution of the input and the probability distribution of the input plus a small random perturbation.

The $D_{KL}$ between two discrete probability distributions P and Q on the same probability space $\chi$ is defined as $$D_{KL}[P \| Q] = \sum_{x \in \chi} P(x) \log \frac{P(x)}{Q(x)} \qquad (15)$$

The VAT cost is calculated using the equation 16, using the same variables as denoted in Adversarial Training with the addition of $D_{KL}$ as the Kullback-Leibler divergence.

$$L_{v-adv}(\theta) = D_{KL}\left[p(\cdot \mid x, \hat{\theta}) \| p(\cdot \mid x + r_{v-adv}; \theta)\right] \qquad (16)$$

$$r_{v-adv} = \arg\max_{r, \|r\| \le \epsilon} D_{KL}[p(\cdot \mid x; \hat{\theta}) \| p(\cdot \mid x + r; \hat{\theta})]$$

In the equation, the probability distributions are denoted as placeholder distributions, $p(\cdot \mid \ldots)$. The actual distribution used will vary depending on the problem.

A classifier is trained to be smooth by minimizing the equation above, which can be considered to making the classifier resilient to worst-case perturbation [28].

VAT in Text Classification

VAT in text classification was first proposed by Takeru Miyato et al. [10]. It expands VAT into the text domain. Since text basically is a sequence of words, the algorithm needs to be updated to handle sequences instead of just raw input.

Denote s to be a sequence containing word embeddings, $s = [\hat{v}_1, \hat{v}_2, \ldots, \hat{v}_k]$ where $\hat{v}_i$ is a normalized word embedding using the equation 176.

$$\hat{v}_i = \frac{v_i - E(v)}{\sqrt{\operatorname{Var}(v)}} \qquad (17)$$

$$E(v) = \sum_{j=1}^{K} f_j v_j, \ \operatorname{Var}(v) = \sum_{j=1}^{K} f_j (v_j - E(v))^2$$

The word embeddings needs to be normalized to avoid making the perturbations insignificant by learning embeddings with very large norm. In equation 17, E is the expectation and Var is the variance.

Figure 20:
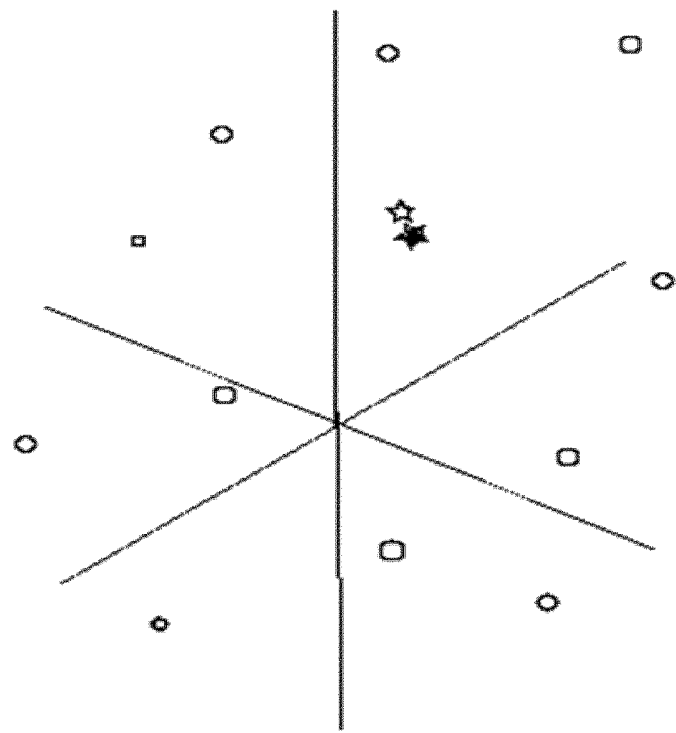
FIG. 20 is a schematic view illustration VAT perturbation of the embedding values for a word.

In Adversarial Training for text classification, the updated loss function for sequences can be seen in equation 18. The variables are used in the same way as previous subsections, as in equation 14 and in equation 16, but with the addition of r being the gradient calculated efficiently during backpropagation and N being the number of labeled entries in the dataset. The symbol $\nabla_x$ is the gradient using the observation x during backpropagation. FIG. 20 illustrates embedding perturbation as is used in VAT on text.

$$L_{adv}(\theta) = -\frac{1}{N} \sum_{n=1}^{N} \log p(y_n \mid s_n + r_{adv,n}; \theta) \qquad (18)$$

$$r_{adv} = \epsilon g / \|g\|_2$$

$$g = \nabla_s \log p(y \mid s; \hat{\theta})$$

Figure 21:
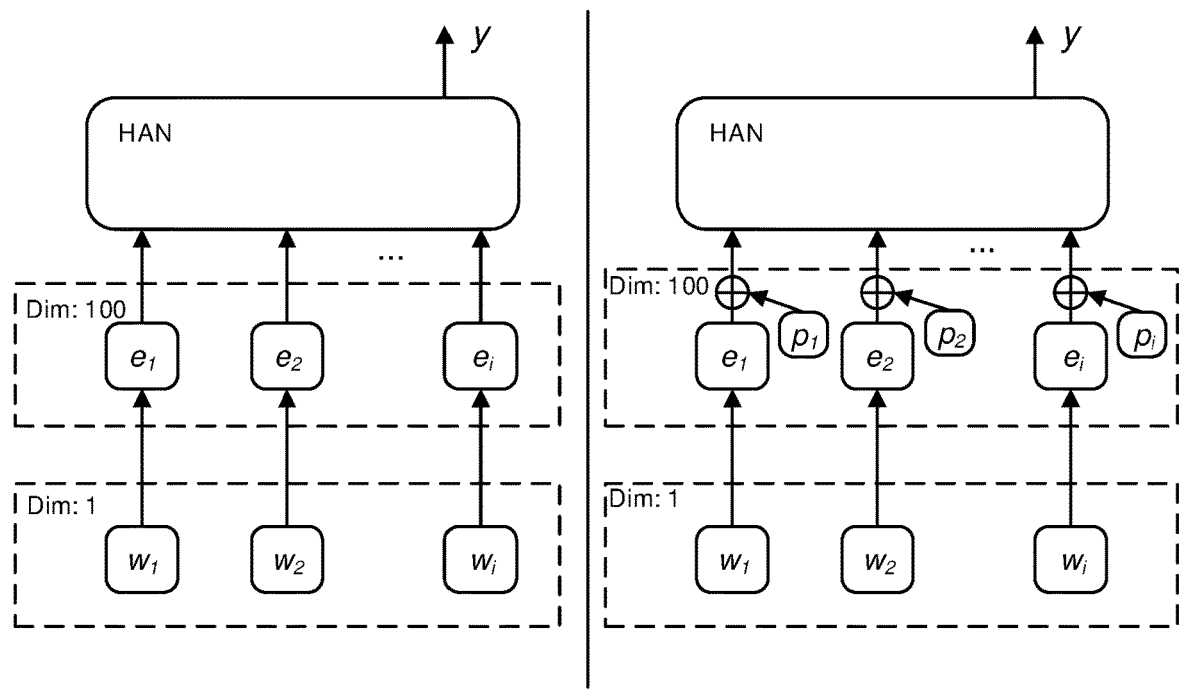
FIG. 21 illustrates embeddings with HAN (left picture) and perturbated embeddings with HAN (right picture).

By using a sequence of word embeddings as the input instead of the sequence of the tokenized words, applying the perturbations obtained from the VAT-calculation directly on the embeddings will create adversarial examples suitable for text, as shown in FIG. 21.

In VAT for text classification the approximated virtual adversarial perturbation is calculated using the equations in Equation 18. This is done at each training step. The number of labeled and unlabeled examples are denoted as N', but otherwise the same variables are used as in equation 14, Equation 16 and in Equation 18.

$$L_{v-adv}(\theta) = \frac{1}{N'} \sum_{n'=1}^{N'} D_{KL}[p(\cdot \mid s_{n'}; \hat{\theta}) \| p(\cdot \mid s_{n'} + r_{v-adv,n'}; \theta)] \qquad (19)$$

$$r_{v-adv} = \epsilon g/\|g\|_2$$

$$g = \nabla_{s+d} D_{KL}[p(\cdot|s; \hat{\theta}) \| p(\cdot|s+d; \hat{\theta})]$$

Neural Networks

After establishing a simple baseline Logistic Regression, the results suggested that the problem could be solved with machine learning. At this point, more complex model architectures were considered. There are different advantages to recurrent neural networks (RNNs) and convolutional neural networks [29]. Several previous works use CNNs in the context of security text classification [30][7].

It was chosen to implement a HAN model utilizing a RNN layer. This was in part because a recent study, which proposed the SRN model, had already established that CNNs were effective in this classification domain at this time. The study only compared against variations of itself and did not leave test data to allow benchmarking, it was found there was room to further explore both the potential of CNNs and RNNs in this task. The CNN model is a publicly available implementation of SRN made by the authors, which only requires some extra lines of code to make work. The model itself is there in its entirety but hyperparameters are not tuned the same as their private versions. In this disclosure, the aim is to do the SRN model justice with our own hyperparameters and benchmark against the same test sets for both our HAN model and our version of SRN.

Hierarchical Attention Network

Figure 22:
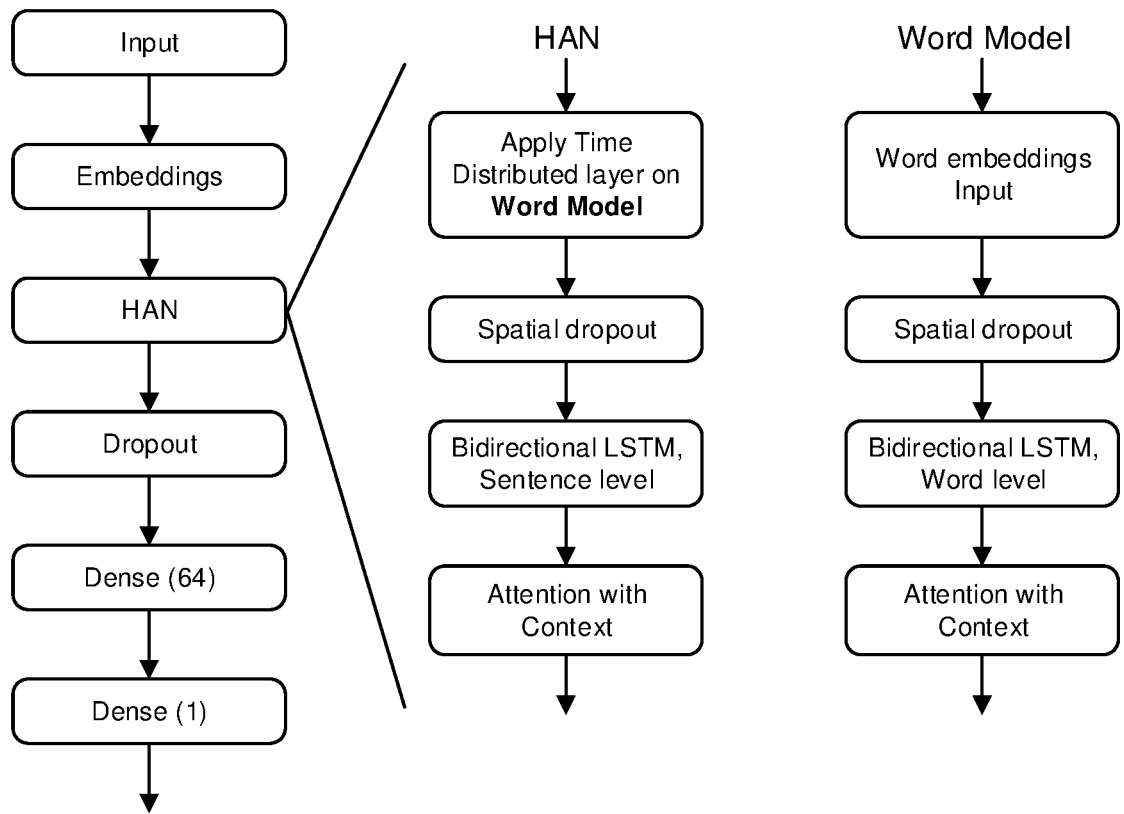
FIG. 22 showing the layer structure of HAN.

The HAN architecture consists of a word level section followed by sentence level section. The model can be seen in FIG. 22. The input to the model is the text document data. The first layer is a frozen embedding layer, mapping each word to the corresponding stored embedding values. This is followed by a spatial dropout layer, first proposed by Tompson et al. in 2015 [31], which randomly discards a fraction of the words in each input text. This method has previously been shown to reduce overfitting. The model also makes use of normal dropout, helping reduce overfitting by randomly dropping output from a fraction of the neural net-work's cells.

The LSTM is a CuDNNLS™ optimized for Nvidia GPUs for quicker training, which leaves more room for hyperparameter tuning. The next layer is attention with context at a word level. The attention layer keeps only the most important words of each sentence in the document text. The word encoder model described above is input to a time distributed layer along with sentence divided document text.

A bidirectional LSTM at a sentence level is followed by attention with context on a sentence level, meaning that the most relevant sentences of each document will remain.

Alpha SecureReqNet

The SRN implementation lacks an embedding layer and instead maps the document text data to their embedding values, reshape the result, and feeds the embedding text into the neural network as input along with the max sentence length. The way embedded text is fed into the neural network is effectively the same as in the HAN model because the embedding layer in HAN is frozen, which means the weights cannot be changed during training. For illustrations and more details about this model, refer to the research paper on SRN [7].

The first layer is a 7-gram convolutional layer, with a kernel size of seven words by the embedding dimensions. All the convolutional layers use a ReLU activation function. The resulting 32 vector feature maps are then fed into a max pooling layer, which is responsible for down sampling the patches of a feature map, taking the maximum value of each patch. The flatten layer takes the pooled tensor and flattens it into a one-dimensional vector. The vector is reshaped to (32, 1, 1) followed by a 5-gram convolutional layer. Another max pooling and flatten layer resulting in a 64 feature column matrix. Three 3-gram convolutional layers followed by another max pooling and flatten layer to fully connect the vector.

Towards the end of the model, there is dense layers serve to reduce the number of features and dropout layers to reduce overfitting. The final layer is a dense layer with an output dimension of 2 and activation function is chosen to be softmax. The reason softmax is used is that the prediction is chosen to be multiclass classification with two classes: the security and non-security class. Multiclass classification with two classes is often not needed as the same result can be achieved with a binary classification, the authors of the model may have good motivation to do so. This is in contrast to the previous models, where the prediction value was binary with one dimension. The output of SRN has been adjusted into a 1 dimension prediction at a later stage for consistent and more easily interpreted results. The typical output will be 1 or 0 instead of (1,0) or (0,1).

It is worth noting that the number of trainable features in the model in total is slightly below 100k with a training set of size slightly above 100k. When there is less training data than features in a model, the model may not able to learn the optimal hidden states.

Hierarchical Attention Network with Virtual Adversarial Training

The HAN architecture is also expanded with a VAT-implementation. Hierarchical Attention Virtual Adversarial Network (HAVAN) still retained the HAN-layer structure, but with some extra SSL steps added to it. The embeddings are normalized using the formula in Equation 5.4. The calculation of $L_{v-adv}$ of Equation 18 is then added to the loss function as well as the option to perturb the embeddings of the model during a train step. In HAVAN both labeled and unlabeled data is used during training, making it an SSL-based approach. Labeled data is used for the standard loss function, while both unlabeled and labeled data are used for the VAT loss function.

Since the problem investigated in this disclosure is a binary classification problem, Bernoulli distribution is used as the distributions in Equation 18. The model can be viewed in FIG. 23.

Evaluation

Evaluation is intended to measure the performance of the finished, trained model. The usefulness of this model is can be interpreted from the results below using the following methods. For benchmarking a model, F1 score is a valuable asset as it takes both precision and recall into its calculations. AUC ROC is used to plot the prediction results. In the evaluation, it is important to calculate the statistical significance of the results.

Metrics

The classifiers were evaluated on a test set of Github issues from the large user tagged, mixed source dataset, and separately the held-out gold standard data and the following metrics were recorded: precision, recall, and F1 scores for the positive and negative class. The relevant class for these metrics is primarily the positive class that encompasses security related text. Precision, recall, and F1 score are often used in scientific studies and will give more meaningful context to a predictor's performance than a simple accuracy score. There are several reasons to avoid accuracy, the most prominent being the way it can misrepresent performance on unbalanced test datasets. If only 1% of issues are security related, a model will achieve 99% precision by naively classifying none of the data as security related.

The mean and standard deviation of the evaluations per batch is intended to accurately represent the results. In the initial models, precision of security classifications was seen as one of the most important aspects, as a model with many false positives will waste a lot of human resources. A high precision classifier provides not only usefulness in industry applications, but also provides early insight into the difficulty of the task. While precision is essential, high recall is also important when satisfactory precision has been achieved. The final model comparisons will therefore use F1 score for security related classification.

Area Under the Receiver Operating Characteristics

The evaluation was also plotted as an Area Under the Receiver Operating Characteristics (AUROC). The curve is used to interpret how distinct the distributions for true positives and true negatives are. The overlap in the distributions describe difficulty in classifying the class correctly [32]. AUROC has the benefit of comparing a random positive observation and seeing if it was classified as more positive than a random negative observation. This allows for a better representation of softer judgement that is useful for example if one wishes to use soft classification in the form of probabilities or scores relating to being positive or negative.

Statistical Properties

In order to quantify how well the classification results will represent performance on a larger dataset, statistical significance must be established. The size of the test data must be large enough to be able to make statements about the classification performance as a whole with at least 95% confidence.

Datasets

The evaluation consists of two datasets: Debricked Labeled Test Set and Github User Labeled Test Set. The sets are annotated under different policies, which will bring clarity as to how well the models detect more subtle signs of vulnerabilities. It also answers the question as to how well the model generalizes to other definitions of security. It is expected that the Debricked dataset is much more difficult and is not expected to produce good results. The model is trained on data similar to the Github User dataset and as such, it should perform much better on this test set.

Results

The evaluation results for each model will be presented in this section.

The comparisons of interest are:
 Utilization of training data—how much classification performance is gained from having a larger amount of training data?
 Weak Detection—do some models perform better on the less strict criteria defined in the annotation guidelines.
 Convergence rate—how quickly does the model learn the problem.
 Sensitivity to hyperparameter tuning.

There are two test sets used in the final evaluation of each model, User Labeled Test Set and Debricked Test Set. The results on these test sets can be seen in FIGS. 24 and 25. Since we care more about the performance on the security related data, the results on the security class above the macro average score was prioritized.

Figures 23, 24:
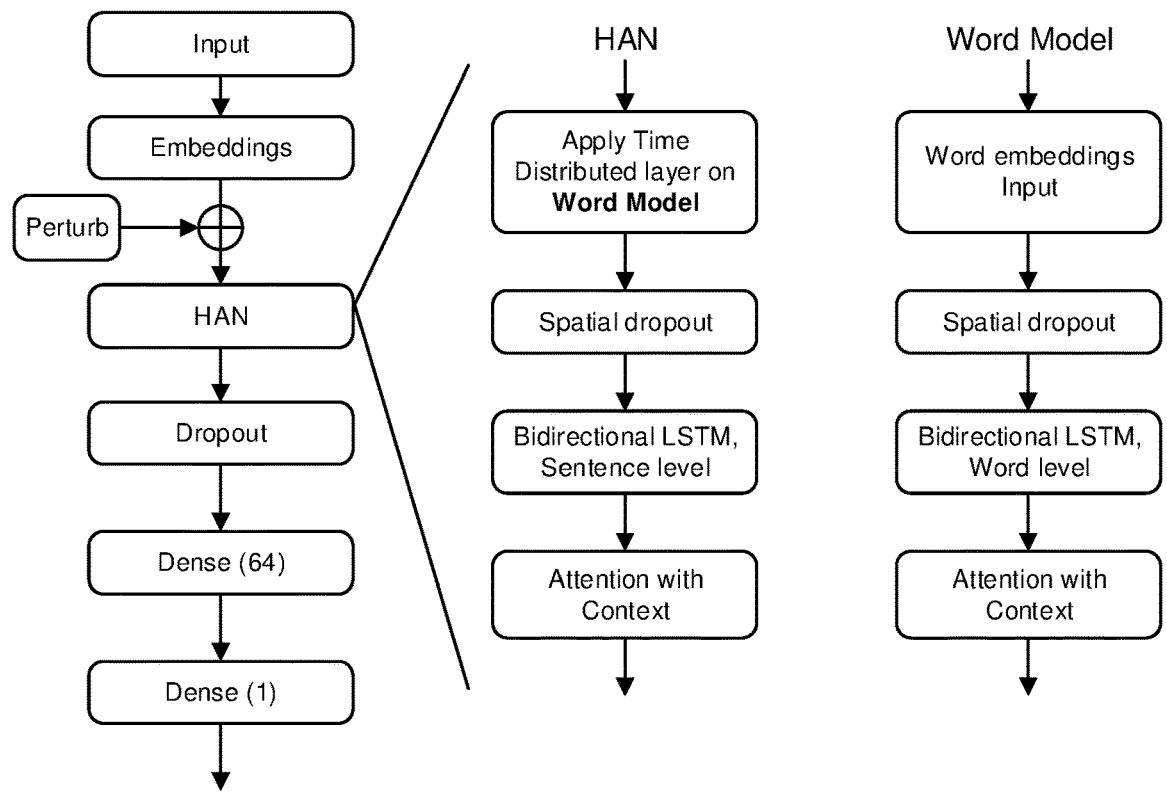
FIG. 23 showing the layer structure of HAVAN (HAN with VAT)
FIG. 24 is a table presenting best results for each model on User Labeled Test Set.

As can be seen in FIG. 24, the best model when evaluating on community or user tagged Github issues is either HAN or the simple Logistic Regression. HAN achieves higher F1 score for security related content, while Logistic Regression was able to achieve slightly better precision. Note, there is low variance in performance when comparing the tested models on this test set.

When evaluating on the data annotated by the guidelines presented in this disclosure, it was observed that the HAVAN model is superior on this test set. The F1 score HAVAN is only a few percent above HAN, but the precision is much higher.

In FIG. 25, the 95% confidence interval of the security-related results are evaluated. Observe that the Debricked Test Set evaluation is less accurate because there are much fewer observations in this test set. In future work, it would be interesting to expand this set in order to improve the correctness of the evaluation.

Figure 27:
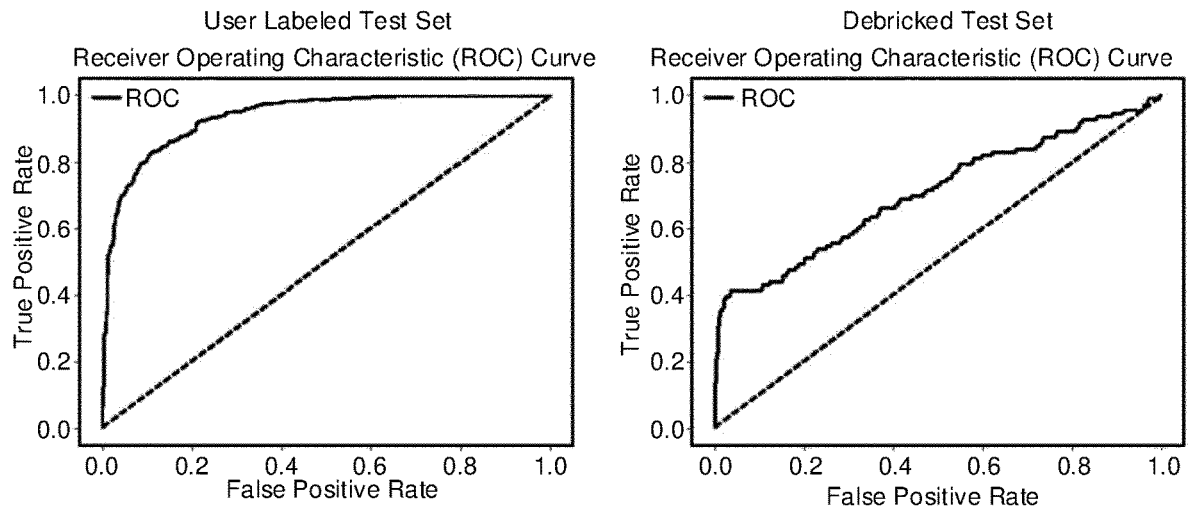
FIG. 27 illustrates AU-CROC of User Labeled Test Data and AUCROC of Debricked Test Set on the HAVAN model.

The AUC scores can be seen in FIG. 26. Observe that the User Labeled Test Set achieves much better AUC scores and thus shows a much more distinct separation of the distributions of security and non-security data in comparison to Debricked Labeled Test Dataset. Note that the models are optimized for maximum validation accuracy, where the validation set contains User Labeled observations. The logistic regression approach achieved the best AUC score for both test set, closely followed by HAVAN. The FIG. 27 shows ROC Curve of HAVAN on both test sets.

Statistical Significance

Figure 28:
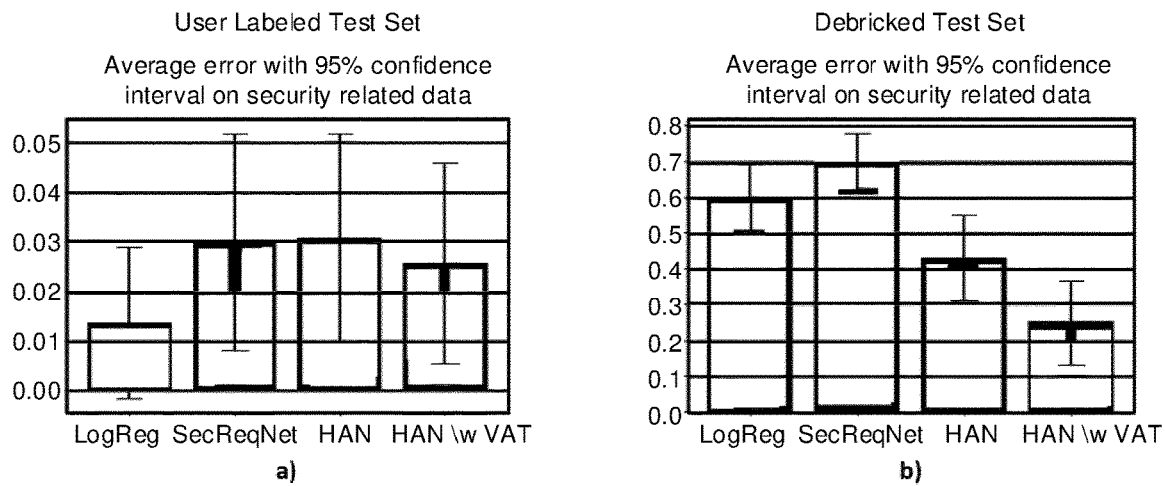
FIG. 28 is a schematic view of the average error on security related data with its 95% confidence interval.

The confidence interval for the error on positive prediction was not too promising on the Debricked Test Set, as can be seen in FIG. 28. The confidence interval was quite large, which could be attributed to the small number of security related issues in the test set. Lack of human resources for annotating Github issues meant that this problem was not easily solved. In the future, we would like to expand this set to allow evaluation with more certain results. On the other hand, the confidence interval on the User Labeled Test Set was much smaller, meaning the evaluation is more precise.

Discussion

Data

In the exploratory data analysis stage, it was clear that the domains of NVD and Github had little overlap. This is considered during training and evaluation, as the models train primarily on NVD for security related text since security related Github issues are in short supply. Despite these issues, the HAN model was still able to achieve remarkable precision on security issues on Github. The mediocre recall can be attributed to the diversity in security related text and the many types of vulnerabilities that exist. It is possible that many types of vulnerabilities that appear in the test set have not appeared in the training set or that the text is phrased differently than CVE/CWE descriptions.

The results for Debricked Labeled test set and User Labeled test set vary greatly, with the models performing consistently worse on the Debricked Labeled set. This can be attributed in part due to the much more inclusive definition of security related, as seen in the Appendix. The models are hyperparameter optimized to maximize the validation accuracy, and the validation set contains a mix of data from a sample of the User Labeled set. The training data does not contain any data labeled according to the annotation guidelines constructed in this disclosure. The User Labeled test set may be much easier to predict due to the security tagged Github data mostly being similar to the text in NVD data. Note that the annotations for Debricked Labeled test set do not consider discussion related to cyber-security that is not indicative of risk to be security-related by tag. This includes suggestions or questions regarding security topics. It is possible that the models have trouble distinguishing security-related text that actually indicates risk as well as the harmless text. To better train the models to deal with this type of wrongful prediction, this type of data likely needs to be present in the training dataset. The User Labeled set has not been completely verified to be correctly annotated and relies on accurate tags from Github users. The VAT based HAN model had the best precision on the Debricked Labeled test set security category, which may be attributed to useful regularization making it more adaptable to problems similar to the training problem.

The models evaluated do not use the comments of each Github issue, only the description of the issue itself. This was done deliberately since the model should detect vulnerabilities at an early stage, before it gets tagged as security related. A better performance on test data could most likely be achieved by adding the comment texts to each Github data entry. It is possible that the clues to vulnerabilities are hidden in the comment section. This could lead to a lower recall as the model lacks context, but could also be one of the reasons why the precision on Debricked Test Set is lower. The Debricked Test set was annotated only based on the text in the title and in the description of the issue, while the model might have learned something that most security related issues have in common in the description even though it doesn't mention anything about security. Perhaps if the issues in Debricked Test set were annotated with full context of comments, some of them would have been labeled differently. Undiscovered vulnerabilities may exist in the safe class in training, validation, and test datasets. While the text itself may not seem security related to a human annotator, it is possible that the neural networks have found vulnerability patterns that may be difficult for humans to detect. Further analysis as to what issues are mislabeled could offer insight in regards to what is learned by the models.

Embeddings

The embeddings primarily used were created by Palacio et al. (2019). The intention was in part to represent the SRN results as favorably as possible, as well as saving time training our own embeddings. GloVe embeddings were temporarily tested as well with similar results. It is possible that training our own embeddings specific for the security text classification task can further improve the results presented in this disclosure.

Evaluation

The model with the highest F1 score with proper hyperparameters ended up being the HAN model without VAT, as noted in the Result section, for the User Labeled Test Set. The best precision and F1 score on the Debricked Test Set is achieved by HAVAN. The claimed accuracy for SRN could not be achieved with the test data that were used. Note that their open-source implementation was used with our data cleaning and preprocessing. Embedding solution had to be implemented by us as well. Hyperparameter tuning of the models was done to a near identical amount to make the comparisons as fair as possible. We reached out to the authors for their test data so we could benchmark against their claimed accuracy but were not able to acquire it. Therefore, the SRN model may perform better with different parameters or cleaning.

Optimization and Training Philosophy

The classifiers are High Precision (HP) classifiers, prioritizing the precision on the security class. A high precision on security will result in few false positives that would otherwise waste precious time for cybersecurity personnel. This comes at the cost of lower recall meaning that many vulnerabilities will be left undetected. HP classifiers provide several benefits since they can be combined in an ensemble approach to increase recall on vulnerability detection assuming that the HP classifiers make different mistakes.

The results from training with varying hyperparameters gave widely different results for SRN, to a larger degree than HAN. It is possible that models that vary more in their results depending on hyperparameters have final results that are less representative of their potential prediction scores. With this aspect in mind, the SRN model may have more room for improvement than the HAN variant, which could provide context for its lower overall performance. A sensitive model requires more tuning until it reaches similar scores to an insensitive model and may result in more training time overall. Hyperparameter tuning is expensive, so insensitive models are preferable when possible.

Semi-Supervised Learning

Our implementation of VAT was not able to provide much better results than a model without it. Leveraging large unlabeled datasets is an endeavor that is worth continuing to pursue as most data is innately unlabeled and amount of data available plays a large part in learning potential of a given classification problem. Due to time constraints, the potential of VAT may not have been fully explored as different hyperparameters could be superior compared to the hyperparameters that best fit the base HAN model.

Mistakes and Bias

The temporal domain is not considered when splitting test and train datasets. This could give the models clairvoyant knowledge about future vulnerabilities, which could skew the results slightly. Therefore, the results may be more representative of classification accuracy of previously known vulnerability types. The test set was not engineered to contain every type of vulnerability, which may bias the results. A larger test set minimizes these concerns as more types of vulnerabilities will be present in a larger set.

The means of generating labeled data for training in sufficiently large quantities was underestimated and ultimately resulted in using data that was already tagged as being security related. Finding data that was related to computer security was time consuming. Few issues on Github relate to security and even fewer are tagged as security related by a user. The lack of balance in the distribution of security and non-security related Github issues meant that acquiring sufficient security issues with uniform sampling would take a very long time. From the uniformly sampled issues, only about 8% of the issues were vaguely security related in content. The security related part of the training set had to use CWE/CVE descriptions from vulnerability database entries.

Conclusion

In this disclosure, expansion on the concept of using NLP for security text classification has been made. While the problem of security text classification is undeniably a difficult task, there are still improvements that can be made and techniques to explore. The viability of the HAN architecture, designed for documents, in the domain has been proven. The concept of SSL in NLP in the domain of security has shown promising results, indicating that the vast unlabeled data can be leveraged in this task. VAT improved the performance of classification on the Debricked Test Set. The algorithms described can help reduce labor cost and improve open-source security through automation.

The best performance on the User Labeled Test Set was achieved by the HAN model with 97% precision and 49% recall. In contrast, the best model for the industry test set (Debricked) was achieved by HAVAN at 75% precision and 35% recall. Considering that the performance on the user labeled test set was very similar for all the models and the performance varied substantially more for the industry test set, the HAVAN model was considered the best performing model in the end.

Future Work

Though the results look promising, there are still a lot to improvements to investigate as future work. There was no time to implement and evaluate all the techniques and concepts available but suggest alternatives for additional research in this section.

The data cleaning step can be greatly improved by removing random noise such as tokens that occur too often or too seldom. Tokens that are underrepresented will not be something the model can learn from, for example those that occur only once. These tokens can be replaced by an Unknown token that will be present in a meaningful amount of documents. The same concept can be used to give value to numbers with a tag for perhaps years and version numbers.

Transfer learning on a language model utilizing ALBERT could prove promising. The more data available the more powerful this method should be.

The definitions of computer security risk that also counts potential exposures such as memory leaks and crashes is difficult to train for and the domains are somewhat different. Multiclass classification schemes may be more suited to the annotation guidelines that were created.

Hyperparameter tuning is an unending process, leaving room for further optimization.

An interesting future prospect is to combine vulnerability detection algorithms with a vulnerability classification model that can categorize the vulnerabilities by CWE descriptions. It is also possible to incorporate means of scoring these vulnerabilities with a Common Vulnerability Scoring System (CVSS) that aims to measure the severity of vulnerabilities [33].

Transfer Learning

Recent work [34][35] in NLP shows that transfer learning is more than promising. As transfer learning revolutionized machine learning in other fields such as Computer Vision, it has in the past two years gained a lot of traction in NLP.

Just recently, ALBERT was released and showed promising results that more parameters doesn't always translate to just better results [35]. Even more recently T5 was released and showed that any natural language problem could be transformed into a sentence prediction problem [36].

As future work, it would be interesting to see what fine-tuning T5 and ALBERT would do for our results.

Semi-Supervised Learning

With the enormous amounts of unlabeled data available online, the prospect of trying different SSL methods in the future is enticing.

The Semi-supervised learning method evaluated in this disclosure was Virtual Adversarial Training. It mainly modified the loss function and was therefore possible to add to an existing model. Other SSL approaches studied were Semi-supervised Variational Auto-encoders (SSVAE) [37] and Discriminative Adversarial Networks (DAN)[9], but due to lack of time wasn't implemented.

Method for Identifying Vulnerabilities

Figure 31:
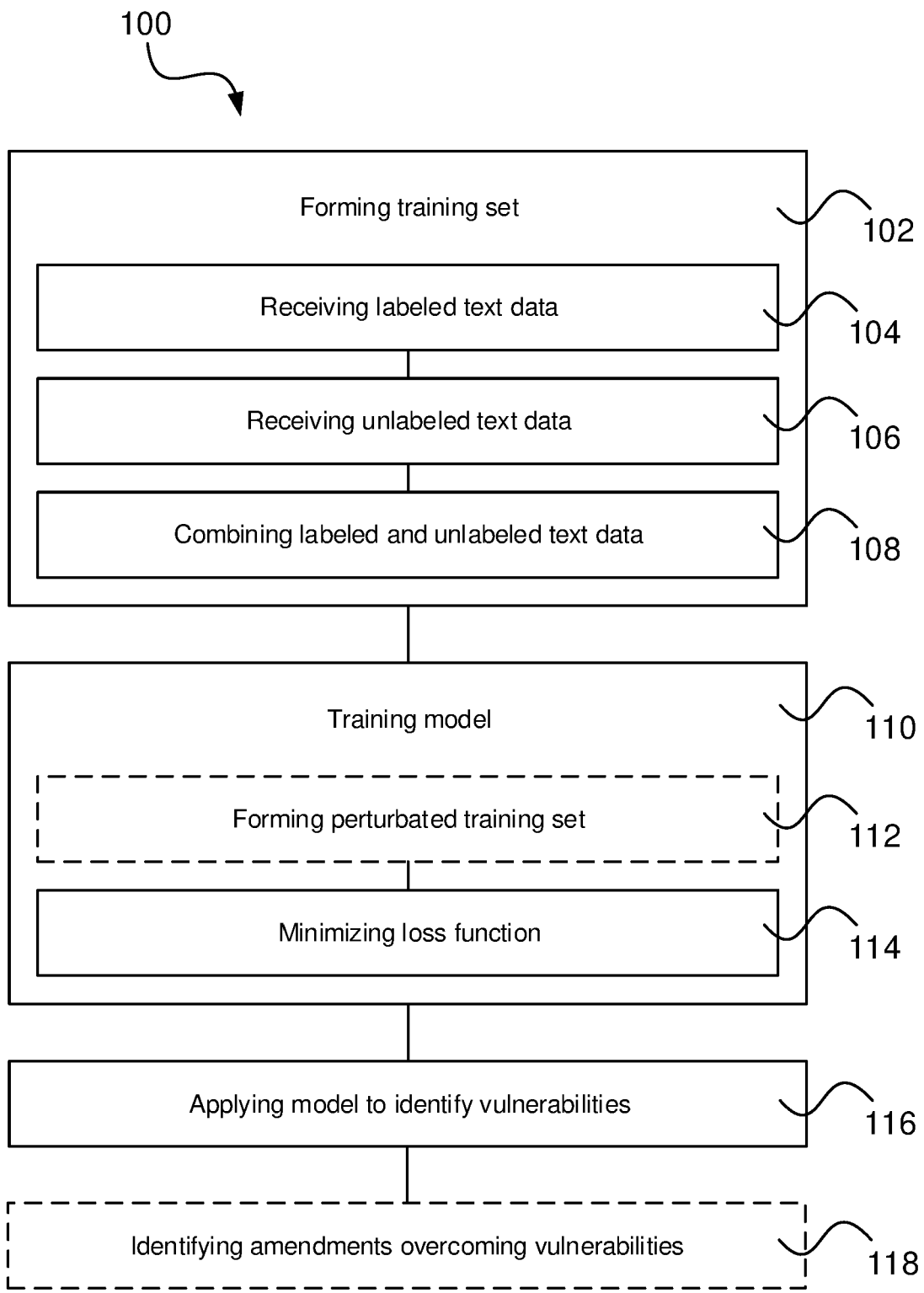
FIG. 31 is a flowchart illustrating a method for identifying vulnerabilities in computer program code.

FIG. 31 is a flowchart illustrating steps of a method 100 for identifying vulnerabilities in computer program code by way of example. In a first step 102, a training data set is formed using semi-supervised learning (SSL). This step can comprise the sub-steps of receiving 104 labeled text data from a first database set, wherein the labeled text data comprises input (x) and label (y), receiving 106 unlabeled text data from a second database set, wherein the unlabeled data comprises the input (x), wherein the unlabeled text data comprises sets of posts generated by a plurality of users, and combining 108 the unlabeled text data and the labeled text data into the training set. In a second step 110, a model is trained based on the training data set using e.g. virtual adversarial training (VAT). This step can comprise the sub-step of forming 112 a perturbated training set by embedding perturbations in the training data set, minimizing 114 a loss function (L) of the perturbated training set, wherein the loss function comprises parameters ($\theta$) used in the model. Finally, in a third step 116, the model can be applied on the computer program code such that the vulnerabilities are identified.

Optionally, in addition to identifying vulnerabilities, in a fourth step 118, amendments to the code overcoming potential risks associated with the vulnerabilities may be identified, and presented to the user such that he or she can amend the code in an expedient manner, which may comprise refer to a different version of open source used in the code.

System for Identifying Vulnerabilities

Figure 32:
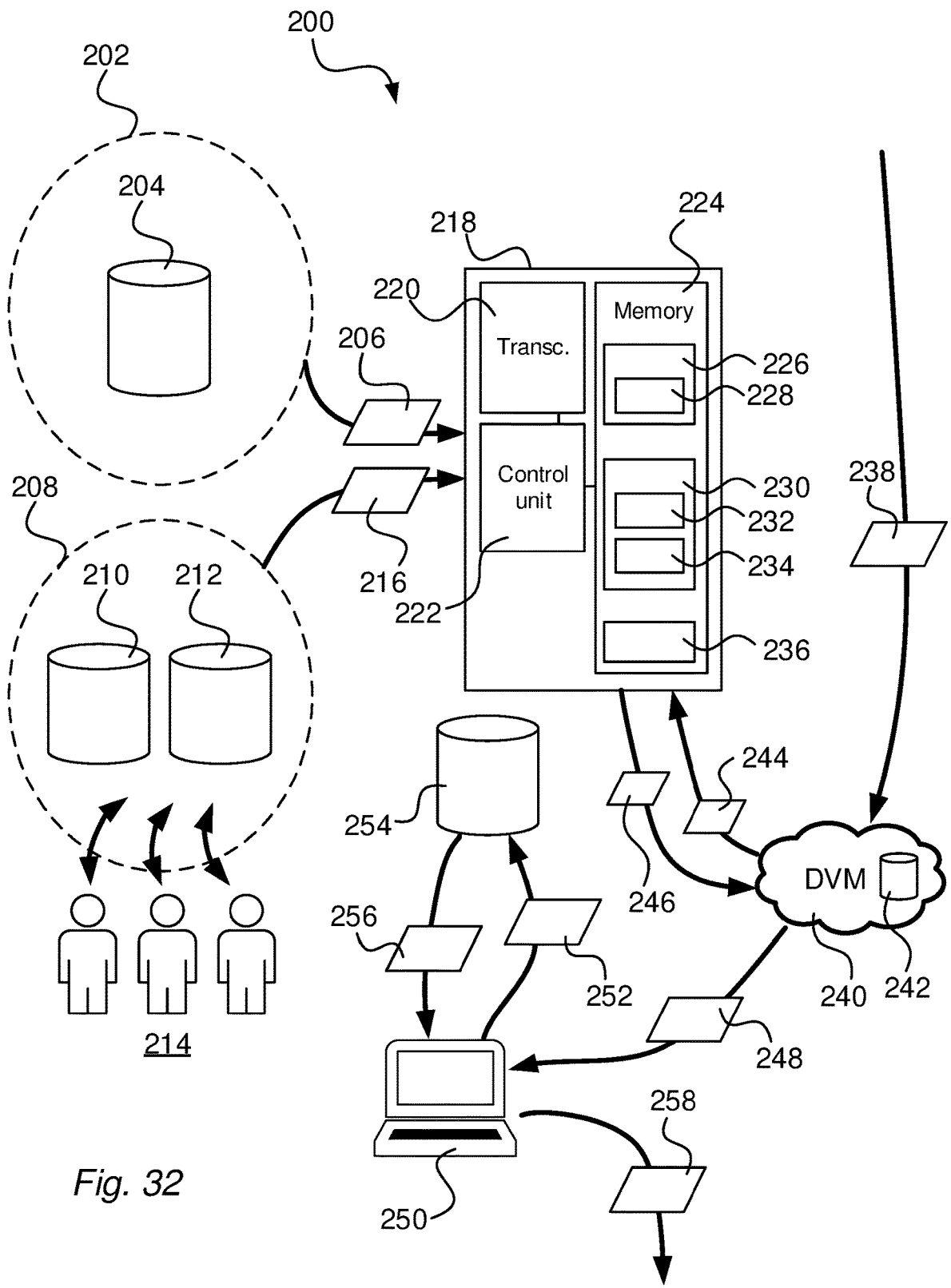
FIG. 32 illustrates a system for identifying vulnerabilities in computer program code.

FIG. 32 generally illustrates a system 200 for identifying vulnerabilities in computer program code by way of example. In a first database set 202, labeled text data 206 comprising input (x) and label (y), i.e. a labeled pair (x,y), as described more in detail above, can be provided. The input x can be a text related to an issue related to open source and the label y may be linked to this text and may provide information about whether or not this text is a vulnerability or not. The label y may also comprise information about which type of vulnerability it is or how severe the vulnerability is. The first database set 202 may comprise one single database 204 as illustrated. An example of a database that can form part of this database set 202 is NVD (National Vulnerability Database). Further, it is possible that several databases are used for providing the first database set 202.

Via a second database set 208, which may comprise a first and a second database 210, 212, unlabeled text data 216 may be provided. An example of a database that can be used in this second database set 208 is Github™, but other platforms or services used by developers for discussing code issues may be used as well. The unlabeled text data 216 may be provided by a plurality of users 214 contributes via forums or other information sharing services provided via the databases of the second database set 208. As described in detail above, this information may in combination with the labeled text data 206 be useful for providing methods and tools for detecting vulnerabilities in computer program code. Also, data stored in the first database set 202 may be provided by a plurality of users, but with the difference that the data held in the first database set 202 is labeled, i.e. the input x is linked to the label y. In the second database set 208 the input x is provided, but this is not linked to the label y. Put differently, issues, i.e. input x, forming part of the first database set 202 are linked to vulnerabilities via the label y, while issues, i.e. the input x, of the second database set 208 is not linked to any vulnerabilities, but may nevertheless be related to vulnerabilities. By using the technology presented above in combination with having access to vast amount of data, a combination of the two database sets 202, 208 can provide an efficient tool for finding and overcoming vulnerabilities in code, particularly open source code.

Both the labeled text data 206 and the unlabeled text data 216 can be transferred to a server 218. Even though illustrated as being one server having a transceiver 220, a control unit 222 and a memory 224, it is equally possible to use a plurality of apparatuses for achieving the same effect, e.g. a server farm.

In line with the flowchart illustrated in FIG. 25, the memory 224 can hold instructions related to a training set formation function 226 configured to form a training data set using semi-supervised learning (SSL) by a combination sub-function 228 configured to combine the unlabeled text data 216 and the labeled text data (206) into a training set, a training function 230 configured to train a model based on the training data set using e.g. virtual adversarial training (VAT) by a perturbating training set sub-function 232 configured to form a perturbated training set by applying perturbations in the training data set, and a minimization function 234 configured to minimize a loss function (L) of the perturbated training set, wherein the loss function comprises parameters (θ) used in the model, and an application function 236 configured to apply the model on the computer program code 238 such that the vulnerabilities are identified.

Put differently, the labeled text data 206 and the unlabeled text data 216 received from the first and second database set 202, 208, respectively, can be used as input for training the model such that vulnerabilities can be identified using this model. For the unlabeled text data 216 virtual adversarial training (VAT) can be used, but other semi-supervised learning techniques may be used.

After having the model trained, this can be used in different ways. In FIG. 26 one example is illustrated. In this example, computer program code 238 can be received by a dependency vulnerability management (DVM) 240. Even though illustrated as a cloud service, this does not have to be the case.

The DVM 240 can have access to a database 242 in which information related to issues may be stored. By using the database 242, a data set 244 may be formed and transmitted to the server 218. The data set 244 may e.g. comprise information about which open source that is used in the computer program code 238 as well as which versions that are used.

In return from the server 218, the DVM 240 can receive a data set 246 comprising information about vulnerabilities. Based on the information provided via the data set 246, the DVM can provide recommendations on how the computer program code 238 can be amended to avoid or at least reduce the vulnerabilities. Such recommendations can be that a different version of a software package should be used. These recommendations can be provided to a user in different ways. In the illustrated example, a computer program code with recommended amendments 248 can be transmitted from the DVM 240 to a computer 250 of the user.

The user may agree to the recommendations suggested or if more than one recommendation is provided, the user may choose a preferred one. After having provided his or her input, a request 252 for code or information may be transmitted to an open source repository 254. In return to this request 252, the code or the information 256 is transmitted to the computer 250. If only reference to different versions are to be made, communication between the open source repository 254 and the computer 250 can be omitted.

Based on the code or information 256 provided from the open source repository 254, a vulnerability checked computer program code 258 can be output from the computer.

Even tough not illustrated, the computer program code 238 may be sent from the computer 250 to the DVM.

From the description above follows that, although various embodiments of the invention have been described and shown, the invention is not restricted thereto, but may also be embodied in other ways within the scope of the subject-matter defined in the following claims.

APPENDIX

Annotation Guidelines

A policy was established in order to quicken the annotation process and ensure that similar annotations were made. All data in the gold standard was annotated by one of the authors of this disclosure. The authors have moderate knowledge in the field of cybersecurity, a condition that must be met in order to adequately label data as relating to computer security. Some data was annotated by both parties and compared in the cases of mismatch to ensure the annotations were similar.

The task of annotating the issues was both hard and tedious. A lot of the issues were ambiguous and unclear, making it important to create a policy. An annotation guideline were worked on to establish an unified labeling method. It was updated regularly during the annotation phase whenever a new kind of case arose.

The following categories do not discriminate between questions, warnings, or other discussions about a certain topic. The text is annotated as the most severe category that accurately describes it. The priority goes from Vuln being highest to Safe being lowest.

Vuln: Presence of known (footnote with list of known exploits in appendix) exploits, user reported vulnerabilities.

Risk: Commonly exploited methods such as: unrestricted user input, memory leaks, unexpected/unintended r/w/e os/database access, overflows, user reported potential risk, segmentation fault, access violation.

Caution: Breaking changes, breaking dependencies, breaking compilation, breaking updates, installation issues, authentication problems, port or socket malfunctioning, firewall issues service unavailable, site down, failed tests, out of memory, crash due to instabilities, unexpected/unintended r/w/e os/database deny, broken links, unknown CPU usage (mostly high usage with no obvious reason for it), incorrect mathematical calculations (with potential side effects), runtime errors, unknown memory issues, configuration problems of server, error-flags concerning security, talks about computer security in some way.

Unsure: Unexpected behavior, minor breaking changes (e.g. new functionality that has not been used in production in previous version), lack of confidence in its safety, UI bugs, development mode only issues Safe: Text doesn't cover topics concerning the categories below, issues asking for help with potential programming mistakes.

N-Grams
Sample Text Data
Before Cleaning

"3.6.3: Wrong number format after copy past action <p>Run <code>SELECTTO_NUMBER ('0.0000001969', '9999.9999999999') FROM dual</code><br>copy result to clipboard and past back to sql editor and you get <strong>1.969E-7</strong></p>"

After Cleaning

"wrong number format after copy past action run select to number from dual copy result to clipboard and past back to sql editor and you get e"

Most Common Words in Clusters

Clusters Cluster 0: git: [('site', 468), ('web', 421), ('page', 337), ('cross', 124), ('add', 95)] nvd: [('site', 16340), ('cross', 15690), ('web', 14419), ('scripting', 13506), ('remote', 12516)]

Cluster 1: git: [('like', 50097), ('use', 43732), ('add', 30520), ('way', 29108), ('using', 27821)] nvd: [('use', 906), ('number', 767), ('candidate', 755), ('reject', 754), ('consultids', 754)]

Cluster 2: git: [('function', 46234), ('return', 36355), ('code', 29743), ('var', 29735), ('error', 25113)] nvd: [('function', 337), ('pointer', 145), ('null', 144), ('dereference', 138), ('issue', 121)]

Cluster 3: git: [('version', 66493), ('expected', 58000), ('reproduce', 55980), ('steps', 52028), ('behavior', 40896)] nvd: [('issue', 137), ('os', 110), ('linux', 107), ('using', 107), ('information', 103)]

Cluster 4: git: [('text', 15564), ('like', 13093), ('using', 12237), ('html', 11632), ('css', 10889)] nvd: [('bu_er', 8), ('issue', 8), ('width', 8), ('html', 7), ('using', 7)]

Cluster 5: git: [('js', 21429), ('node', 16274), ('_le', 15831), ('webpack', 15559), ('use', 14492)] nvd: [('plugin', 18), ('wordpress', 12), ('module', 11), ('wp', 7), ('_les', 6)]

Cluster 6: git: [('php', 22225), ('error', 21127), ('line', 19804), ('version', 19748), ('_le', 16532)] nvd: [('php', 351), ('allows', 151), ('information', 146), ('_le', 146), ('attackers', 140)]

Cluster 7: git: [('using', 16351), ('window', 13958), ('issue', 13596), ('like', 13333), ('version', 12148)] nvd: [('issue', 44), ('does', 41), ('linux', 39), ('user', 35), ('kernel', 33)]

Cluster 8: git: [('xcode', 13946), ('version', 13047), ('error', 12325), ('ios', 12197), ('build', 12076)] nvd: [('android', 127), ('versions', 80), ('id', 64), ('product', 61), ('privilege', 54)]

Cluster 9: git: [('error', 20556), ('src', 13511), ('version', 13480), ('main', 13039), ('run', 11743)] nvd: [('issue', 64), ('discovered', 63), ('kernel', 47), ('linux', 44), ('pointer', 34)]

Cluster 10: git: [('id', 15958), ('type', 15954), ('query', 12266), ('version', 11657), ('database', 11496)] nvd: [('id', 359), ('user', 351), ('users', 206), ('use', 184), ('password', 166)]

Cluster 11: git: [('com', 64751), ('https', 60539), ('github', 41509), ('http', 23746), ('issue', 14004)] nvd: [('com', 43), ('https', 41), ('http', 30), ('issue', 15), ('github', 14)]

Cluster 12: git: [('remote', 272), ('memory', 252), ('service', 151), ('allows', 150), ('allow', 148)] nvd: [('allows', 58536), ('remote', 50901), ('attackers', 48861), ('vulnerability', 36376), ('improper', 35862)]

Cluster 13: git: [('app', 8918), ('atom', 8468), ('version', 4396), ('js', 4082), ('_le', 3947)] nvd: [('app', 80), ('user', 62), ('users', 58), ('local', 58), ('resources', 51)]

Cluster 14: git: [('_le', 45117), ('error', 21490), ('version', 21175), ('_les', 19919), ('using', 18173)] nvd: [('_le', 980), ('users', 969), ('local', 968), ('allows', 575), ('_les', 546)]

Cluster 15: git: [('react', 30831), ('component', 25160), ('using', 13295), ('render', 12735), ('use', 12213)] nvd: [('component', 27), ('issue', 7), ('versions', 7), ('vulnerable', 6), ('a_ected', 6)]

Cluster 16: git: [('node', 39042), ('js', 37974), ('error', 29139), ('modules', 27661), ('lib', 18784)] nvd: [('module', 74), ('node', 65), ('js', 52), ('information', 49), ('exposure', 44)]

Cluster 17: git: [('server', 25890), ('error', 24841), ('http', 18885), ('using', 17925), ('request', 17913)] nvd: [('server', 742), ('user', 446), ('information', 417), ('http', 355), ('access', 323)]

BIBLIOGRAPHY

[1] Synopsys, "2018 open source security and risk analysis synopsys cybersecurity research center." https://www.synopsys.com/content/dam/synopsys/sig-assets/reports/2018-ossra.pdf.

[2] Synopsys, "2019 open source security and risk analysis synopsys cybersecurity research center." https://www.synopsys.com/content/dam/synopsys/sig-assets/reports/rep-ossra-19.pdf.

[3] R. Ferenc, P. Hegedüs, P. Gyimesi, G. Antal, D. Bán, and T. Gyimothy, "Challenging machine learning algorithms in predicting vulnerable javascript functions," pp. 8-14, 05 2019.

[4] Z. Yang, D. Yang, C. Dyer, X. He, A. Smola, and E. Hovy, "Hierarchical attention networks for document classification," in *Proceedings of the 2016 Conference of the North American Chapter of the Association for Computational Linguistics: Human Language Technologies*, (San Diego, Calif.), pp. 1480-1489, Association for Computational Linguistics, June 2016.

[5] D. Zou, Z. Deng, Z. Li, and H. Jin, *Automatically Identifying Security Bug Reports via Multitype Features Analysis*, pp. 619-633. 06 2018.

[6] D. Behl, S. Handa, and A. Arora, "A bug mining tool to identify and analyze security bugs using naive bayes and tf-idf," 2014.

[7] D. N. Palacio, D. McCrystal, K. Moran, C. Bernal-Cárdenas, D. Poshyvanyk, and C. Shene_el, "Learning to identify security-related issues using convolutional neural networks," 2019.

[8] I. J. Goodfellow, J. Pouget-Abadie, M. Mirza, B. Xu, D. Warde-Farley, S. Ozair, A. Courville, and Y. Bengio, "Generative adversarial networks," 2014.

[9] C. N. dos Santos, K. Wadhawan, and B. Zhou, "Learning loss functions for semisupervised learning via discriminative adversarial networks," 2017.

[10] T. Miyato, A. M. Dai, and I. Goodfellow, "Adversarial training methods for semisupervised text classification," 2016.

[11] J. Xuan, H. Jiang, Z. Ren, J. Yan, and Z. Luo, "Automatic bug triage using semi-supervised text classification," 2017.

[12] W. Xu, H. Sun, C. Deng, and Y. Tan, "Variational autoencoders for semi-supervised text classification," 2016.

[13] J. Rocca, "Understanding variational autoencoders (vaes)." https://towardsdatascience.com/understanding-variational-autoencoders-vaes-f70510919f73.

[14] C. D. M. J. Pennington, R. Socher, "Glove: Global vectors for word representation." https://nlp.stanford.edu/projects/glove/.

[15] L. T. G. at the University of Oslo, "Nlpl word embeddings repository." http://vectors.nlpl.eu/repository/.

[16] T. Kocmi and O. Bojar, "An exploration of word embedding initialization in deeplearning tasks," 2017.

[17] L. McInnes, J. Healy, and J. Melville, "Umap: Uniform manifold approximation and projection for dimension reduction," 2018.

[18] S. Ruder, "An overview of gradient descent optimization algorithms," 2016.

[19] J. Duchi, E. Hazan, and Y. Singer, "Adaptive subgradient methods for online learning and stochastic optimization," *Journal of Machine Learning Research*, vol. 12, no. July, pp. 2121-2159, 2011.

[20] D. P. Kingma and J. Ba, "Adam: A method for stochastic optimization," 2014.

[21] M. M. Lopez and J. Kalita, "Deep learning applied to nlp," 2017.
[22] S. Bai, J. Z. Kolter, and V. Koltun, "An empirical evaluation of generic convolutional and recurrent networks for sequence modeling," 2018.
[23] Y. Zhang and B. Wallace, "A sensitivity analysis of (and practitioners' guide to) convolutional neural networks for sentence classification," in *Proceedings of the Eighth International Joint Conference on Natural Language Processing* (Volume 1: Long Papers), (Taipei, Taiwan), pp. 253-263, Asian Federation of Natural Language Processing, November 2017.
[24] D. Bahdanau, K. Cho, and Y. Bengio, "Neural machine translation by jointly learning to align and translate," 2014.
[25] A. Vaswani, N. Shazeer, N. Parmar, J. Uszkoreit, L. Jones, A. N. Gomez, L. Kaiser, and I. Polosukhin, "Attention is all you need," *CoRR*, vol. abs/1706.03762, 2017.
[26] M. Nguyen, "Illustrated guide to lstm's and gru's: A step by step explanation." https://towardsdatascience-.com/illustrated-guide-to-lstms-and-gru-s-a-step-by-step-explanation-44e9eb85bf21.
[27] I. J. Goodfellow, J. Shlens, and C. Szegedy, "Explaining and harnessing adversarial examples," 2014.
[28] T. Miyato, S. ichi Maeda, M. Koyama, K. Nakae, and S. Ishii, "Distributional smoothing with virtual adversarial training," 2015.
[29] W. Yin, K. Kann, M. Yu, and H. Schütze, "Comparative study of cnn and rnn for natural language processing," 2017.
[30] Z. Han, X. Li, Z. Xing, H. Liu, and Z. Feng, "Learning to predict severity of software vulnerability using only vulnerability description," in *2017 IEEE International Conference on Software Maintenance and Evolution* (ICSME), pp. 125-136, September 2017.
[31] J. Tompson, R. Goroshin, A. Jain, Y. LeCun, and C. Bregler, "Efficient object localization using convolutional networks," 2014.
[32] S. Narkhede, "Understanding auc-roc curve." https://towardsdatascience.com/understanding-auc-roc-curve-68b2303cc9c5.
[33] O. Jormakka, "Approaches and challenges of automatic vulnerability classification using natural language processing and machine learning techniques," 2019.
[34] J. Devlin, M. W. Chang, K. Lee, and K. Toutanova, "Bert: Pre-training of deep bidirectional transformers for language understanding," 2018.
[35] Z. Lan, M. Chen, S. Goodman, K. Gimpel, P. Sharma, and R. Soricut, "Albert: A lite bert for self-supervised learning of language representations," 2019.
[36] C. Ra_el, N. Shazeer, A. Roberts, K. Lee, S. Narang, M. Matena, Y. Zhou, W. Li, and P. J. Liu, "Exploring the limits of transfer learning with a uni_ed text-to-text transformer," 2019.
[37] W. Xu, H. Sun, C. Deng, and Y. Tan, "Variational autoencoders for semi-supervised text classification," 2016.

The invention claimed is:

1. A method for identifying vulnerabilities in computer program code, said method comprising
forming a training data set using semi-supervised learning (SSL) comprising the sub-steps of
receiving labeled text data from a first database set, wherein the labeled text data comprises input (x) and label (y),
receiving unlabeled text data from a second database set wherein the unlabeled text data comprises the input (x), and wherein the unlabeled text data comprises sets of posts generated by a plurality of users,
tokenizing at least one of the labeled text data an unlabeled text data to form a plurality of tokens;
removing from the plurality of tokens a set of noise tokens to form a filtered set of tokens, a frequency of occurrence of the set of noise tokens causing random noise in the training data;
combining the unlabeled text data and the labeled text data into the training data set, the training data set comprising the filtered set of tokens but excluding the set of noise tokens,
training a model based on the training data set comprising the sub-step of minimizing a loss function (L) of the training set, wherein the loss function comprises parameters ($\Theta$) used in the model,
applying the model on the computer program code such that the vulnerabilities are identified.

2. The method according to claim 1, wherein the removing comprises replacing each of the set of noise tokens with an unknown token and wherein the step of training involves using virtual adversarial training (VAT), and the sub-step of
forming a perturbated training set by applying perturbations to the training data set, and
wherein the sub-step of minimizing the loss function (L) is based on the perturbated training set.

3. The method according to claim 1, wherein the sets of posts are marked as open or closed.

4. The method according to claim 1, wherein the sets of posts comprise time stamps.

5. The method according to claim 1, wherein the second database set comprises a repository of standards-based vulnerability management data.

6. The method according to claim 1, wherein the second database set comprises repositories publicly providing the sets of posts.

7. The method according to claim 1, wherein the computer program code is open-source code.

8. The method according to claim 2, wherein the training set comprises input (x) and the perturbated training set comprises the input (x) plus a random perturbation (r), and the loss function is a Kullback-Leibler divergence ($D_{KL}$) between a probability distribution of the training set and the probability distribution of the perturbated training set.

9. The method according to claim 1, wherein the model is a Hierarchical Attention Network (HAN).

10. The method according to claim 1, wherein the model comprises Recurrent Neural Network (RNN) layers.

11. The method according to claim 1, further comprising identifying amendments overcoming the vulnerabilities in the computer program code.

12. The method of claim 1, wherein the input (x) in the labeled text data comprises text related to an issue related to open source and wherein the label (y) is linked to the corresponding input (x) in the labeled text data and comprises information about one or more of whether or not the corresponding input (x) in the labeled text data is a vulnerability and which type of vulnerability the corresponding input (x) in the labeled text data relates to.

13. The method of claim 12, wherein the input (x) in the unlabeled text data comprises text related to an issue related to a vulnerability and wherein input (x) in the unlabeled text data is not linked to a label (y).

14. A computer-readable storage medium storing instructions that, when executed by a microprocessor, cause the microprocessor to perform the steps of claim 1.

15. A server configured for identifying vulnerabilities in computer program code, said server comprising a transceiver, a microprocessor and a memory, wherein the transceiver is configured to:
  receive labeled text data from a first database set, wherein the labeled text data comprises input (x) and label (y),
  receive unlabeled text data from a second database set, wherein the unlabeled text data comprises the input (x), wherein the unlabeled text data comprises sets of posts generated by a plurality of users,
  wherein the microprocessor is configured to execute:
  data cleaning instructions that, when executed
  tokenize at least one of the labeled text data and unlabeled text data to form a plurality of tokens;
  remove from the plurality of tokens a set of noise tokens to form a filtered set of tokens, a frequency of occurrence of the set of noise tokens causing random noise in a training data set comprising the tokenized at least one of the labeled text data and unlabeled text data;
  training set formation instructions that, when executed, form the training data set using semi-supervised learning (SSL) by
    a combination sub-function configured to combine the unlabeled text data and the labeled text data into a training set, the training data set comprising the filtered set of tokens but excluding the set of noise tokens,
    a training function configured to train a model based on the training data set by
    a minimization function configured to minimize a loss function (L) of the training set, wherein the loss function comprises parameters (Θ) used in the model,
  application instructions that, when executed, apply the model on the computer program code such that the vulnerabilities are identified.

16. The server according to claim 15, wherein the training function is configured to train the model using virtual adversarial training (VAT) by a perturbating training set sub-function configured to form a perturbated training set by applying perturbations to the training data set, and the minimization function is configured to minimize a loss function (L) of the perturbated training set.

17. The server according to claim 15, wherein the sets of posts are marked as open or closed and wherein the removing comprises replacing each of the set of noise tokens with an unknown token.

18. The server according to claim 15, wherein the sets of posts comprise time stamps.

19. The server of claim 15, wherein the input (x) in the labeled text data comprises text related to an issue related to open source and wherein the label (y) is linked to the corresponding input (x) in the labeled text data and comprises information about one or more of whether or not the corresponding input (x) in the labeled text data is a vulnerability and which type of vulnerability the corresponding input (x) in the labeled text data relates to.

20. The server of claim 19, wherein the input (x) in the unlabeled text data comprises text related to an issue related to a vulnerability and wherein input (x) in the unlabeled text data is not linked to a label (y).

* * * * *